United States Patent
Chung et al.

(10) Patent No.: US 11,638,891 B2
(45) Date of Patent: May 2, 2023

(54) WATER FILTER SYSTEM

(71) Applicant: Kohler Co., Kohler, WI (US)

(72) Inventors: Chanseol Chung, Milwaukee, WI (US); Tsung-Yu Lu, Kohler, WI (US); Daniel E. Smith, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 82 days.

(21) Appl. No.: 15/983,526

(22) Filed: May 18, 2018

(65) Prior Publication Data
US 2018/0339248 A1 Nov. 29, 2018

Related U.S. Application Data

(60) Provisional application No. 62/509,833, filed on May 23, 2017.

(51) Int. Cl.
*B01D 33/01* (2006.01)
*C02F 1/00* (2006.01)
*C02F 101/20* (2006.01)
*C02F 101/12* (2006.01)

(52) U.S. Cl.
CPC .............. *B01D 33/01* (2013.01); *C02F 1/002* (2013.01); *B01D 2201/202* (2013.01); *C02F 2101/12* (2013.01); *C02F 2101/20* (2013.01); *C02F 2303/02* (2013.01)

(58) Field of Classification Search
None
See application file for complete search history.

(56) References Cited

U.S. PATENT DOCUMENTS

| | | | | |
|---|---|---|---|---|
| 127,427 A * | 6/1872 | Potter | ................. | A47J 19/022 100/247 |
| 161,640 A * | 4/1875 | Smith | ................. | A47J 31/20 99/297 |
| 163,286 A * | 5/1875 | Watson | ................. | A47J 31/20 99/297 |
| 194,702 A * | 8/1877 | Mayerhofer | ................. | A47J 31/20 99/297 |
| 204,099 A * | 5/1878 | Schmitz | ................. | A47J 31/20 99/287 |

(Continued)

FOREIGN PATENT DOCUMENTS

| CN | 1837109 A | 9/2006 |
|---|---|---|
| CN | 203620357 U | 6/2014 |

(Continued)

OTHER PUBLICATIONS

Why Grayl?; https://thegrayl.com/pages/why-grayl; 13 pages; © 2018 GRAYL.

(Continued)

*Primary Examiner* — Robert J Popovics
(74) *Attorney, Agent, or Firm* — Patterson Thuente, P.A.

(57) ABSTRACT

A water filter system comprising a container configured to contain water, a lid configured to attach to the container, a filter element configured to filter the water and movable within the container, and a plunger coupled to the filter element and movable through the lid. The water filter system is at least one of powered by a mechanical force directly from a user or self-powered and is not electrically powered.

12 Claims, 13 Drawing Sheets

(56) References Cited

U.S. PATENT DOCUMENTS

| | | | | |
|---|---|---|---|---|
| 211,236 | A * | 1/1879 | Hartman | A47J 31/20 99/287 |
| 336,089 | A * | 2/1886 | Chamberland | B01D 29/39 210/413 |
| 376,319 | A * | 1/1888 | Lane | A47J 31/20 99/298 |
| 454,879 | A * | 6/1891 | Palmieri | A47J 31/20 99/310 |
| 476,851 | A * | 6/1892 | Williams | A47J 31/20 99/319 |
| 568,005 | A * | 9/1896 | Kes | B01F 31/441 366/256 |
| 607,409 | A * | 7/1898 | Falardeau | A47J 31/4403 99/623 |
| 722,833 | A * | 3/1903 | Purlong | B01F 31/441 366/256 |
| 755,126 | A * | 3/1904 | Furst | B30B 15/08 100/238 |
| 802,378 | A * | 10/1905 | Ellis | A47J 31/54 99/305 |
| 912,279 | A * | 2/1909 | Brockette | A01J 25/114 241/84.3 |
| 1,053,735 | A * | 2/1913 | Lefevre | A47J 31/20 99/297 |
| 1,068,450 | A * | 7/1913 | Roberts | F16B 39/24 366/276 |
| 1,243,982 | A * | 10/1917 | Rupp | B01F 31/441 D7/300.1 |
| 1,346,485 | A * | 7/1920 | De Arrigunaga | A47J 31/20 99/287 |
| 1,386,340 | A * | 8/1921 | Wuster | B01D 33/015 210/359 |
| 1,538,210 | A * | 5/1925 | Offenhauser | B01J 3/04 100/248 |
| 1,552,565 | A * | 9/1925 | Morton | A47J 31/007 99/303 |
| 1,598,818 | A * | 9/1926 | Happensack | B30B 9/06 100/247 |
| 1,636,727 | A * | 7/1927 | Willner | A47G 19/14 99/319 |
| 1,699,303 | A * | 1/1929 | Mennicke | A47J 31/20 99/285 |
| 1,797,672 | A * | 3/1931 | Paolini | A47J 31/20 99/287 |
| 1,873,023 | A * | 8/1932 | Peirce | A47J 31/20 99/287 |
| 1,948,431 | A * | 2/1934 | Rolph | A47J 43/105 366/243 |
| 2,053,021 | A * | 9/1936 | Cassol | A47J 31/20 99/287 |
| 2,207,335 | A * | 7/1940 | Thomas | A01J 13/00 366/242 |
| 2,211,486 | A * | 8/1940 | Zoia | A47J 31/20 99/287 |
| 2,291,708 | A * | 8/1942 | Gluck | A47J 43/105 366/260 |
| 2,436,077 | A * | 2/1948 | Robertson | C02F 1/003 210/416.3 |
| 2,459,498 | A * | 1/1949 | Cameron | A47J 31/20 366/244 |
| 2,481,352 | A * | 9/1949 | Sabatella | A47J 43/1081 366/260 |
| 2,601,821 | A * | 7/1952 | Johnson | A47J 31/02 99/287 |
| 2,631,826 | A * | 3/1953 | Wolf | B43L 25/00 74/89.45 |
| 2,749,834 | A * | 6/1956 | Hiscock | A47J 31/20 99/287 |
| 2,935,928 | A * | 5/1960 | Keating | A47J 31/20 99/287 |
| 3,020,823 | A * | 2/1962 | Ferdinando | A47J 31/20 426/433 |
| 3,115,664 | A * | 12/1963 | Del Ponte | A45D 34/048 366/318 |
| 3,137,228 | A * | 6/1964 | Elow | A47J 31/20 99/287 |
| 3,140,078 | A * | 7/1964 | Grubb | B01F 35/7161 222/386 |
| 3,158,084 | A * | 11/1964 | Cohn | A47J 31/20 99/297 |
| 3,279,351 | A * | 10/1966 | Cohn | A47J 31/20 99/297 |
| 3,307,474 | A * | 3/1967 | Kasher | A47J 31/20 99/298 |
| 3,339,476 | A * | 9/1967 | De Troya | A47J 31/20 99/287 |
| 3,413,908 | A * | 12/1968 | Nadelson | A47J 31/20 99/297 |
| 3,546,129 | A * | 12/1970 | Youngdahl | B01F 33/5011 424/283.1 |
| 3,657,993 | A * | 4/1972 | Close | A47J 31/20 99/297 |
| 3,744,767 | A * | 7/1973 | Blasnik | A47J 43/105 366/243 |
| 3,804,635 | A * | 4/1974 | Weber | A47J 31/38 99/302 R |
| 3,927,608 | A * | 12/1975 | Doyel | A47J 31/20 99/298 |
| 4,365,544 | A * | 12/1982 | Howitt | A47J 31/20 D7/317 |
| 4,477,347 | A * | 10/1984 | Sylva | B01D 61/18 210/232 |
| 4,650,583 | A * | 3/1987 | Bondanini | A47J 31/20 210/474 |
| 4,737,036 | A * | 4/1988 | Offermann | A47J 43/1081 366/256 |
| 4,740,301 | A * | 4/1988 | Lopez | B01D 63/068 210/321.87 |
| 4,867,880 | A * | 9/1989 | Pelle | A47J 31/02 426/77 |
| 5,122,285 | A * | 6/1992 | Tartal | E04H 4/16 210/801 |
| 5,164,079 | A * | 11/1992 | Klein | B01D 29/117 210/411 |
| 5,198,111 | A * | 3/1993 | Davis | B01D 29/6438 210/414 |
| 5,419,250 | A * | 5/1995 | Ferguson | B30B 9/06 100/910 |
| 5,461,968 | A * | 10/1995 | Portman | A47J 31/20 99/287 |
| 5,478,586 | A * | 12/1995 | Connor | A47J 31/20 426/433 |
| 5,526,733 | A * | 6/1996 | Klawuhn | A47J 31/4464 99/287 |
| 5,533,802 | A * | 7/1996 | Garganese | B44D 3/127 366/256 |
| 5,544,566 | A * | 8/1996 | Bersten | A47J 31/20 99/287 |
| 5,569,383 | A * | 10/1996 | Vander Ark, Jr. | B01D 29/6476 210/415 |
| 5,570,623 | A * | 11/1996 | Lin | A47J 41/0077 99/285 |
| 5,618,570 | A * | 4/1997 | Banks | A47J 31/20 99/287 |
| 5,635,233 | A * | 6/1997 | Levinson | A47J 36/027 426/433 |
| 5,695,282 | A * | 12/1997 | Hess | B01F 35/4111 366/256 |
| 5,733,464 | A * | 3/1998 | Bunch | B01D 29/15 210/791 |
| 5,761,987 | A * | 6/1998 | Leon | A47J 41/0061 220/592.2 |
| 5,770,074 | A * | 6/1998 | Pugh | A47J 31/20 210/477 |
| 5,809,867 | A * | 9/1998 | Turner | A47J 31/20 99/287 |

(56) References Cited

U.S. PATENT DOCUMENTS

| | | | | |
|---|---|---|---|---|
| 5,857,772 A * | 1/1999 | Washington | B01F 33/5011 | 366/605 |
| 5,871,641 A * | 2/1999 | Davidson | B01D 29/21 | 210/167.13 |
| 5,887,510 A * | 3/1999 | Porter | A47J 31/20 | 99/287 |
| 5,932,098 A * | 8/1999 | Ross | A47J 31/605 | 210/473 |
| 5,943,946 A * | 8/1999 | Chen | A47J 31/20 | 99/323 |
| 5,979,299 A * | 11/1999 | Hornsby | A47J 31/20 | 426/433 |
| 6,079,316 A * | 6/2000 | Barden | A47J 31/20 | 99/287 |
| 6,152,018 A * | 11/2000 | Yeh | A47J 31/20 | 220/636 |
| 6,168,816 B1 * | 1/2001 | Hammond | A23F 5/26 | 426/77 |
| 6,186,052 B1 * | 2/2001 | Huang | A47G 19/14 | 99/287 |
| 6,231,226 B1 * | 5/2001 | Neidigh | A47J 43/1081 | 366/256 |
| 6,231,909 B1 * | 5/2001 | Levinson | A23L 15/00 | 426/585 |
| 6,240,833 B1 * | 6/2001 | Sham | A47J 31/20 | 99/287 |
| 6,283,627 B1 * | 9/2001 | Fromm | B01F 33/5011 | 366/332 |
| 6,295,920 B1 * | 10/2001 | Barden | A47J 31/20 | 99/287 |
| 6,324,966 B1 * | 12/2001 | Joergensen | A47J 31/20 | 99/287 |
| 6,324,967 B1 * | 12/2001 | Robinson | A47J 31/20 | 99/287 |
| 6,358,474 B1 * | 3/2002 | Dobler | C12M 45/02 | 435/270 |
| 6,383,384 B1 * | 5/2002 | Anderson | B01D 61/10 | 210/416.3 |
| 6,422,133 B1 * | 7/2002 | Brady | A47J 31/20 | 99/287 |
| 6,561,080 B1 * | 5/2003 | Feeney | A47J 31/24 | 99/295 |
| 6,684,756 B2 * | 2/2004 | Kerr | A47G 19/16 | 99/287 |
| 6,725,763 B2 * | 4/2004 | Cai | A47J 31/4407 | 99/287 |
| 6,797,160 B2 * | 9/2004 | Huang | A47J 31/20 | 99/289 P |
| 6,833,071 B2 * | 12/2004 | Duby | B01D 25/26 | 210/408 |
| 7,040,218 B1 * | 5/2006 | Biolchini, Jr. | A47J 31/20 | 99/287 |
| 7,077,951 B2 * | 7/2006 | Monteiro | A47J 27/21183 | 210/136 |
| 7,093,531 B2 * | 8/2006 | Tardif | A47J 31/20 | 99/287 |
| 7,194,951 B1 * | 3/2007 | Porter | A47J 31/44 | 99/287 |
| 7,213,507 B2 * | 5/2007 | Glucksman | A47J 31/20 | 99/287 |
| 7,279,660 B2 * | 10/2007 | Long | A47J 31/20 | 219/490 |
| D559,034 S * | 1/2008 | Bodum | D7/376 | |
| 7,323,104 B2 * | 1/2008 | Wennerstrom | C02F 1/003 | 210/416.3 |
| D566,454 S * | 4/2008 | Bodum | D7/319 | |
| 7,389,720 B2 * | 6/2008 | Haverstock | A47J 31/20 | 99/287 |
| 7,524,103 B2 * | 4/2009 | McGill | B01F 35/713 | 366/195 |
| 7,544,294 B2 * | 6/2009 | Halterman | A47G 19/30 | 210/232 |
| 7,559,274 B2 * | 7/2009 | Wilhite | A47J 31/20 | 426/433 |
| 7,578,231 B2 * | 8/2009 | Liu | A47J 31/20 | 99/287 |
| 7,849,784 B2 * | 12/2010 | Adler | A47J 31/02 | 99/287 |
| 7,854,848 B2 * | 12/2010 | Olson | C02F 1/002 | 210/244 |
| 7,905,654 B1 * | 3/2011 | Cordero | B01F 31/445 | 366/256 |
| 7,946,752 B2 * | 5/2011 | Swartz | A47J 43/1031 | 99/287 |
| 8,051,766 B1 * | 11/2011 | Yu | A47J 31/20 | 220/625 |
| 8,075,176 B1 * | 12/2011 | Cordero | B01F 31/40 | 366/256 |
| 8,133,397 B2 * | 3/2012 | Duby | B01D 29/232 | 210/741 |
| 8,152,361 B2 * | 4/2012 | Swartz | A47J 43/27 | 99/287 |
| 8,313,644 B2 * | 11/2012 | Harris | C02F 1/002 | 210/205 |
| 8,323,490 B1 * | 12/2012 | Wright | B01D 29/6484 | 210/474 |
| 8,375,846 B2 * | 2/2013 | Baccetti | A47J 31/20 | 99/297 |
| 8,524,075 B1 * | 9/2013 | Quintel | B01D 29/688 | 210/791 |
| 8,529,119 B2 * | 9/2013 | Swartz | A47G 19/2205 | 99/287 |
| 8,632,680 B2 * | 1/2014 | Hermansson | G01N 30/6021 | 210/656 |
| 8,695,486 B2 * | 4/2014 | Bodum | A47J 31/20 | 99/298 |
| 8,770,097 B2 * | 7/2014 | McLean | A47J 31/38 | 99/322 |
| 9,010,238 B2 * | 4/2015 | Bodum | A47J 31/36 | 222/475.1 |
| 9,022,223 B1 * | 5/2015 | Wright | B01D 29/0029 | 210/413 |
| 9,107,541 B2 * | 8/2015 | Bodum | A47J 31/00 | |
| 9,216,063 B2 * | 12/2015 | Frey | A61B 90/70 | |
| 9,232,873 B2 * | 1/2016 | Juris | A23F 3/18 | |
| 9,248,384 B2 * | 2/2016 | Dominguez | B01D 17/08 | |
| 9,254,352 B2 * | 2/2016 | Kumar | A61M 1/63 | |
| 9,289,091 B2 * | 3/2016 | Baccetti | A47J 31/20 | |
| 9,333,447 B2 * | 5/2016 | McKay | A61B 17/8833 | |
| 9,339,317 B2 * | 5/2016 | Vogt | B01F 35/146 | |
| 9,392,900 B2 * | 7/2016 | McLean | A47J 31/38 | |
| 9,408,490 B2 * | 8/2016 | McLean | B01D 11/0253 | |
| 9,480,279 B2 * | 11/2016 | Fogelin | A47J 31/06 | |
| 9,492,027 B2 * | 11/2016 | Morse | A47J 31/20 | |
| 9,510,705 B2 * | 12/2016 | Rolfes | A47J 31/38 | |
| 9,919,248 B2 * | 3/2018 | Tortorella | B01D 33/01 | |
| 9,968,407 B2 * | 5/2018 | Frey | A61B 10/025 | |
| 10,039,363 B2 * | 8/2018 | Miller | B01F 35/3202 | |
| 10,155,183 B2 * | 12/2018 | Tortorella | B01D 33/01 | |
| 10,172,495 B2 * | 1/2019 | McLean | A47J 31/20 | |
| 10,264,911 B2 * | 4/2019 | McLean | A47J 31/18 | |
| 10,368,685 B2 * | 8/2019 | McLean | B01D 11/0253 | |
| 10,390,651 B2 * | 8/2019 | Beber | A47J 31/44 | |
| 10,493,183 B2 * | 12/2019 | Hensler | A61M 1/79 | |
| 10,517,421 B2 * | 12/2019 | Habram | A47J 31/38 | |
| 10,588,678 B2 * | 3/2020 | McKay | A61B 17/8833 | |
| 10,667,642 B2 * | 6/2020 | Nosier | A47J 31/40 | |
| 10,722,855 B2 * | 7/2020 | Vogt | B01F 23/53 | |
| 10,820,739 B2 * | 11/2020 | Eisenberg | A47J 31/20 | |
| 10,863,857 B2 * | 12/2020 | Herndon | A47J 31/18 | |
| 10,875,000 B2 * | 12/2020 | Vogt | A61B 17/8816 | |
| 10,940,247 B2 * | 3/2021 | Willard | A61M 1/631 | |
| 10,973,363 B2 * | 4/2021 | Dujmich | A47J 31/20 | |
| 2003/0041739 A1 * | 3/2003 | Cai | A47J 27/2105 | 99/287 |
| 2003/0101873 A1 * | 6/2003 | Kerr | A47G 19/16 | 99/287 |
| 2004/0040905 A1 * | 3/2004 | Schmid | B01D 29/686 | 210/488 |

(56) References Cited

U.S. PATENT DOCUMENTS

| | | | |
|---|---|---|---|
| 2005/0046211 A1* | 3/2005 | Nole | B65D 25/2832 294/27.1 |
| 2005/0109689 A1* | 5/2005 | Trachtenbroit | A47J 31/20 210/238 |
| 2006/0021524 A1* | 2/2006 | Liu | A47J 31/20 100/116 |
| 2006/0118481 A1* | 6/2006 | Trachtenbroit | A47J 31/20 210/470 |
| 2006/0151381 A1* | 7/2006 | Wennerstrom | C02F 1/003 210/464 |
| 2006/0185521 A1* | 8/2006 | Publicover | A47J 31/20 99/279 |
| 2007/0028779 A1* | 2/2007 | Pigliacampo | A47J 31/20 99/297 |
| 2007/0056447 A1* | 3/2007 | Swartz | A47J 43/1031 99/287 |
| 2007/0108136 A1* | 5/2007 | Gold | A47J 31/605 210/416.1 |
| 2007/0137495 A1* | 6/2007 | Talbert | A47J 31/20 99/286 |
| 2010/0098823 A1* | 4/2010 | Nenov | A47J 31/36 426/433 |
| 2010/0275785 A1* | 11/2010 | Weissman | A47J 31/20 99/287 |
| 2010/0294135 A1* | 11/2010 | Weissman | A47J 31/20 99/287 |
| 2011/0056385 A1* | 3/2011 | McLean | B01D 11/0253 99/297 |
| 2011/0083560 A1* | 4/2011 | Chen | A47J 31/38 99/279 |
| 2011/0088561 A1* | 4/2011 | Bodum | A47J 31/20 99/297 |
| 2011/0168644 A1* | 7/2011 | Harris | C02F 1/002 210/236 |
| 2011/0192845 A1* | 8/2011 | Swartz | A47J 43/044 220/212 |
| 2012/0017767 A1* | 1/2012 | Samso Besora | A47J 31/38 99/302 R |
| 2012/0167773 A1* | 7/2012 | Swartz | A47G 19/2205 99/287 |
| 2012/0260806 A1* | 10/2012 | Rolfes | A47J 31/38 99/295 |
| 2013/0270161 A1* | 10/2013 | Kumar | A61M 1/79 210/406 |
| 2014/0060337 A1* | 3/2014 | Varnum | A47J 31/02 99/297 |
| 2014/0072684 A1* | 3/2014 | Madden | A47J 31/005 426/431 |
| 2014/0165309 A1* | 6/2014 | Frey | A61B 90/70 15/21.1 |
| 2014/0205725 A1* | 7/2014 | Albanese | A47J 31/20 426/433 |
| 2014/0311353 A1* | 10/2014 | Mclean | B01D 11/0253 99/297 |
| 2015/0059592 A1* | 3/2015 | Richardson | A47J 31/20 99/297 |
| 2015/0093362 A1* | 4/2015 | Dominguez | B01D 33/00 210/329 |
| 2015/0157049 A1* | 6/2015 | Fogelin | B01D 33/015 210/396 |
| 2015/0182060 A1* | 7/2015 | Mclean | A47J 31/20 99/297 |
| 2015/0196158 A1* | 7/2015 | Velasquez | A47J 31/38 99/297 |
| 2015/0282664 A1* | 10/2015 | Savage | A23F 5/262 426/431 |
| 2016/0037960 A1* | 2/2016 | McLean | A47J 31/18 99/297 |
| 2016/0100904 A1* | 4/2016 | Frey | A61B 90/70 15/21.1 |
| 2016/0144302 A1* | 5/2016 | Dominguez | A61L 27/3683 210/329 |
| 2016/0166103 A1* | 6/2016 | Morse | A47J 31/20 99/297 |
| 2016/0227958 A1* | 8/2016 | Zhao | A47J 31/18 |
| 2017/0027372 A1* | 2/2017 | McLean | A47J 31/38 |
| 2017/0071396 A1* | 3/2017 | McLean | A47J 31/38 |
| 2017/0295987 A1* | 10/2017 | Habram | A23F 3/18 |
| 2017/0354939 A1* | 12/2017 | Vogt | B01F 35/7131 |
| 2017/0354942 A1* | 12/2017 | Vogt | A61B 17/8827 |
| 2018/0220838 A1* | 8/2018 | Guo | A23F 5/24 |
| 2018/0339248 A1* | 11/2018 | Chung | C02F 1/002 |
| 2019/0254463 A1* | 8/2019 | McLean | A47J 31/20 |
| 2019/0261807 A1* | 8/2019 | McLean | A47J 31/38 |
| 2019/0358566 A1* | 11/2019 | Dominguez | B01D 17/10 |
| 2020/0070071 A1* | 3/2020 | Chin | B01D 29/114 |
| 2020/0375692 A1* | 12/2020 | Frey | A61B 10/02 |
| 2021/0153686 A1* | 5/2021 | McLean | B01D 11/0253 |
| 2022/0265081 A1* | 8/2022 | Ewing | A47G 21/106 |

FOREIGN PATENT DOCUMENTS

| | | |
|---|---|---|
| CN | 104971534 A | 10/2015 |
| CN | 105617745 A | 6/2016 |
| CN | 206463590 U | 9/2017 |

OTHER PUBLICATIONS

English summary of Chinese Office Action, App. No. 201810527294.1, Kohler Co. (dated Apr. 10, 2020).

Chinese Second Office Action CN Application No. 201810527294.1 dated Dec. 24, 2020, 8 pages.

* cited by examiner

WATER FILTER SYSTEM

CROSS-REFERENCE TO RELATED PATENT APPLICATIONS

This application claims priority to and the benefit of U.S. Provisional Patent Application No. 62/509,833, filed May 23, 2017, the entire disclosure of which is incorporated herein by reference.

BACKGROUND

The present application relates to a water filter system intended to filter water. Typically, in order to filter water (for example, to filter lead or chlorine out of water, etc.), conventional water filtration systems can either actively or passively filter water. Active water filtration systems require pressure to push the water through the filter media. This can be supplied from either electric power (such as an electric pump) to pressurize the water or line pressure from an active water line. The pump, however, tends to make the water filtration system loud and bulky and using water pressure requires installation. Passive water filtration systems, on the other hand, take up a relatively large volume (compared to the amount of water the water filtration system can filter) since passive water filtration systems usually require two separate containers or reservoirs (i.e., an unfiltered water reservoir and a filtered water reservoir) to hold the unfiltered water and the filtered water. The volume of water that the smaller of the unfiltered water reservoir and the filtered water reservoir can store limits the total amount that the passive water filtration system can filter and store. The volume of water that the passive water filter can filter is, at a maximum, half the net volume of water that the unfiltered water reservoir and the filtered water reservoir together can store. Furthermore, passive water filtration systems filter the water relatively slowly since the filtration relies only on gravity as the water passes through the filter.

It would be advantageous to provide an improved system for filtering water that is instead quiet, compact, elegant, and filters water relatively quickly. These and other advantages of the system described herein will become apparent to those reviewing the present disclosure.

SUMMARY

One embodiment relates to a water filter system that comprises a container configured to contain water, a lid configured to attach to the container, a filter element configured to filter the water and movable within the container, and a plunger coupled to the filter element and movable through the lid.

Another embodiment relates to a method of filtering water that comprises moving a plunger and a filter element toward a lid, attaching the lid to a container containing water, and moving the filter element within the container with a plunger that is coupled to the filter element and movable through the lid. The filter element is configured to filter water and filters the water as the filter element moves within the container.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The accompanying drawings, which are included to provide further understanding of the concepts discussed herein, are incorporated in and constitute a part of this specification, and illustrate embodiments of the present disclosure and together with the detailed description serve to explain the principles of the present disclosure.

DETAILED DESCRIPTION

Before turning to the figures, which illustrate the various exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

Referring generally to the figures, disclosed herein are water filter systems, as shown according to various exemplary embodiments.

Water Filter System

Figure 1:
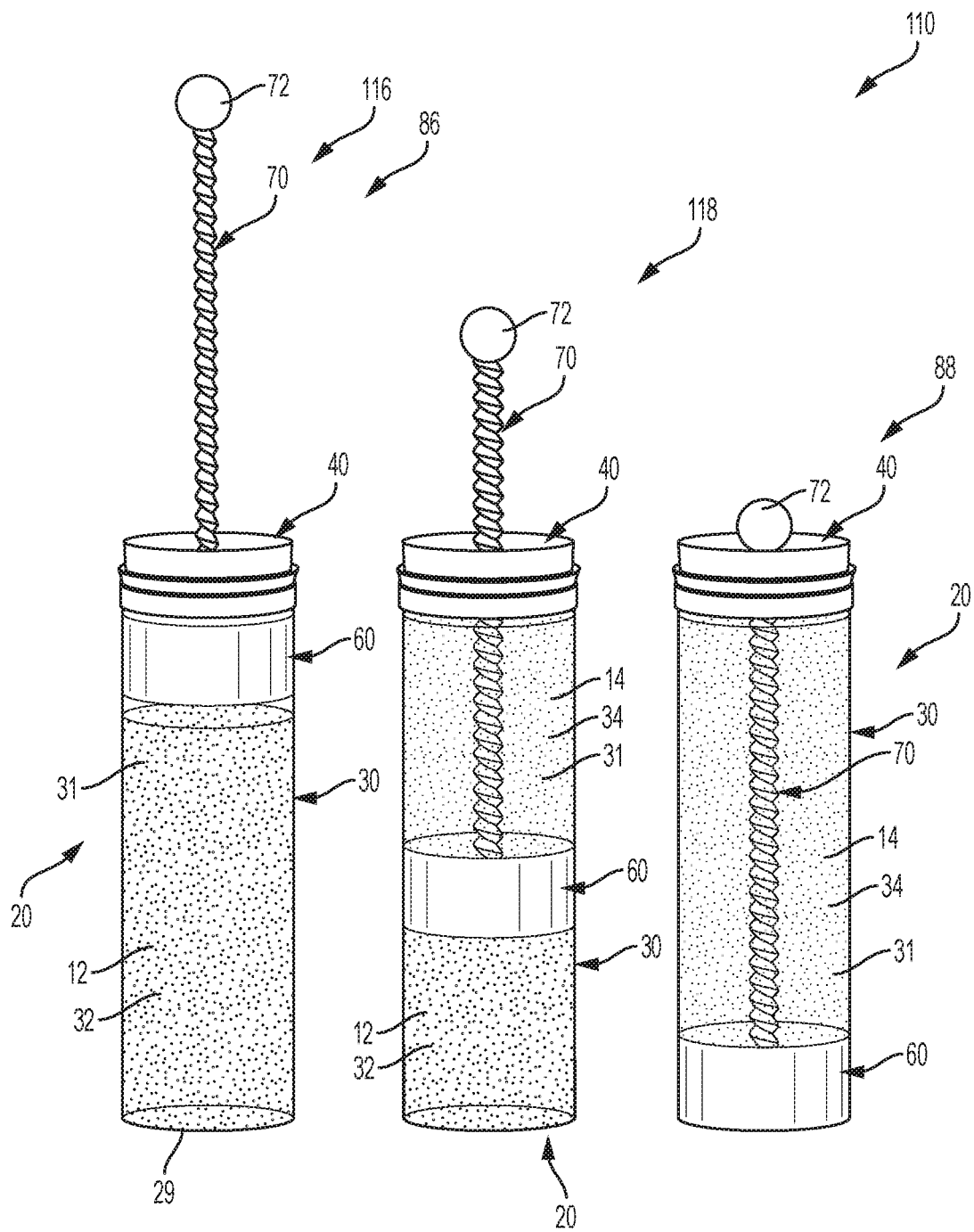
FIG. 1 illustrates perspective views of water filter systems filtering water according to one embodiment.

As shown in FIG. 1, the water press or filter system 20 is configured to filter unfiltered water 12 into filtered water 14. The water filter system 20 can filter a variety of different contaminants and substances out of the unfiltered water 12, such as, for example, chlorine. Alternatively or additionally, the water filter system 20 can be configured to filter out other substances, such as lead or other heavy metals. By filtering the unfiltered water 12 with the water filter system 20, certain tastes and odors can also be removed from the unfiltered water 12. Although water is shown and referred to herein, it is understood that, according to alternative embodiments, the water filter system 20 can be configured to filter a variety of different liquids. Furthermore, the water may optionally be infused with, for example, minerals or fruit.

The water filter system 20 is configured to be mechanically powered (and powered by the user and/or self-powered) and therefore does not rely on or require any electric power to filter the water and is not electrically powered (i.e., is substantially free of any electrical power). For example, as described further herein, the water filter system 20 may use power from a spring and may be spring-powered to power the water filter system 20 and filter the unfiltered water 12. According to another embodiment as described further herein, the water filter system 220 is powered by a mechanical force directly from a user. For example, the water filter system 220 may use hand power from a user and may be hand-powered to power the water filter system 20 and filter the unfiltered water 12.

The water filter system 20 provides effective and fast filtration. However, since the water filter system 20 does not require any electric power and instead utilizes manual power, the water filter system 20 is relatively quiet and is not loud or noisy compared to water filters that utilize electric power. Additionally, the water filter system 20 pressurizes the unfiltered water 12 within the cavity 31 of the container 30, which forces the water through the filter element 60 and allows the water filter system 20 to filter the water relatively quickly, compared to conventional non-electric filters which only rely on gravity. Furthermore, since the water filter system 20 does not require separate containers for the unfiltered water and the filtered water (and instead only includes the container 30), the water filter system 20 is relatively compact, is not bulky, and maximizes the amount of water that the water filter system 20 can filter and contain.

Due to its compact configuration (as described further herein) and elegant look, the water filter system 20 may be used as a "table-top" water filter. The user can use the water filter system 20 wherever they would like and can easily move the transport the water filter system 20 if desired.

As described further herein and shown in FIGS. 1-4, the water filter system 20 includes a container 30, a lid 40, a filter element 60, a plunger 70, and optionally a spring system 80. The various components of the water filter system 20 can be constructed out of a variety of different materials depending on the desired look. For example, the water filter system 20 (including the container 30) can include or be constructed out of a variety of different premium materials (including but not limited to glass, metal (e.g., stainless steel), and/or wood) with a variety of different finishes and colors.

Container

As shown in FIGS. 1-4, the water filter system 20 includes one cup, vessel, or container 30 to contain and store both the unfiltered water 12 and the filtered water 14. The container 30 is configured to contain all of the water within one area that is divided by the filter element 60 (as described further herein), where the water includes both the unfiltered water 12 and the filtered water 14.

The container 30 may be a variety of different shapes, according to the desired configuration and in order to allow the filter element 60 to key into the container 30, which prevents the filter element 60 from rotating within and relative to the container 30 (as described further herein). The filter element 60 has a complementary shape to the inside of the container 30 such that the filter element 60 is movable within and along the length of the container 30. Accordingly, the container 30 and the filter element 60 are shaped such that the filter element 60 cannot rotate within the container 30.

Figure 21:
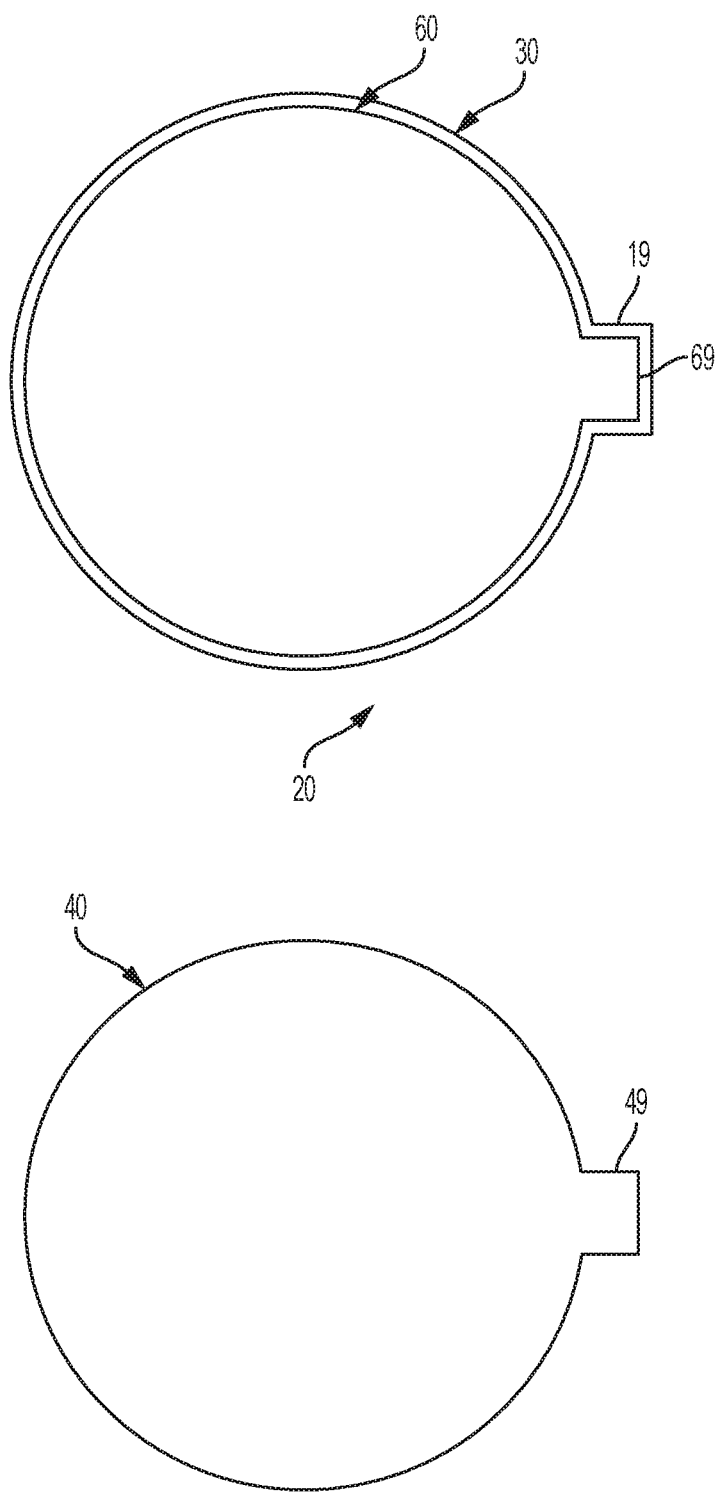
FIG. 21 is a top schematic view of the container, the filter element, and the lid of a water filter system according to another embodiment.

According to one embodiment, the container 30 may be substantially cylindrical with a non-circular cross-section (taken along a horizontal plane that is perpendicular to the length of the container 30), such as a substantially oval cross-section or may be a rectangular or hexagonal prism with a rectangular, or hexagonal cross-section. Alternatively or additionally, one of the container 30 and the filter element 60 may have a groove and the other of the container 30 and the filter element 60 may have a protrusion that is complementary to the groove. For example, as shown in FIG. 21, the container 30 may have a groove 19 that extends along the inner length of the container 30, and the filter element 60 includes a protrusion 69 (as described further herein). (Alternatively, the container 30 may have the protrusion 69 and the filter element 60 may have the groove 19.) The groove 19 of the container 30 is complementary to the protrusion 69 of the filter element 60 such that the protrusion 69 fits within and interlocks with the groove 19, as shown in FIG. 21. With the groove 19, the container 30 may optionally be substantially cylindrical with a substantially circular cross-section (taken along the horizontal plane), while still preventing relative rotation between the filter element 60 and the container 30.

Figure 2:
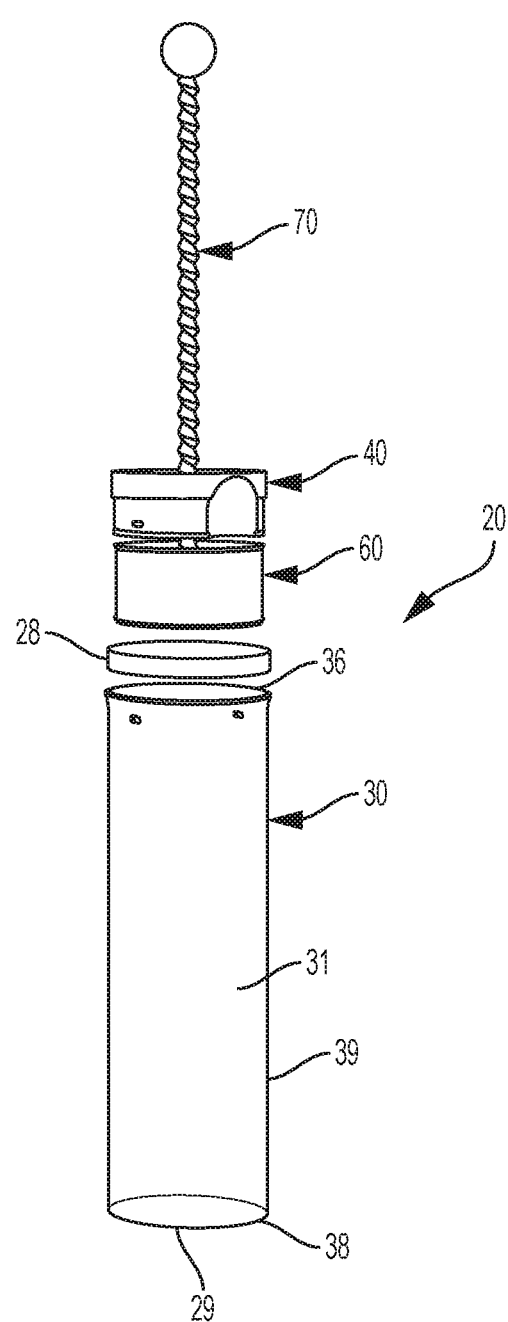
FIG. 2 is an exploded view of the water filter system of FIG. 1.

As shown in FIG. 2, the container 30 extends between a top portion 36 and a bottom portion 38. The top portion 36 of the container 30 is open such that the cavity 31 (as described further herein) of the container 30 is accessible through the top of the container 30. The bottom portion 38 of the container 30 includes an end wall 29 such that the bottom of the container 30 is closed off and the water is contained within the container 30.

As further shown in FIG. 2, the container 30 further includes a side wall 39 and an inner cavity 31. The side wall 39 extends along the length or height of the container 30 between opening at the top portion 36 and the end wall 29 at the bottom portion 38 of the container 30 and defines the inner region or cavity 31. The cavity 31 has an unfiltered water area 32 (that contains the unfiltered water 12) and a filtered water area 34 (that contains the filtered water 14) in order to contain both the unfiltered water 12 and the filtered water 14. The filter element 60 (as described further herein) is positioned within the cavity 31 of the container 30 and separates or divides the cavity 31 into the unfiltered water area 32 and the filtered water area 34 such that the unfiltered water 12 is separate from the filtered water 14 within the container 30. As the filter element 60 moves along the length of the container 30 (within the cavity 31) and filters unfiltered water 12 into filtered water 14 (as shown in FIG. 1), the filter element 60 converts the unfiltered water area 32 into the filtered water area 34 as the filter element 60 decreases the size of the unfiltered water area 32 (and the amount of unfiltered water 12) and accordingly increases the size of the filtered water area 34 (and the amount of filtered water 14). Accordingly, the water filter system 20 maximizes the amount of water it can filter and store (compared to conventional passive water filter systems) without taking up any extra room or creating unused space with two separate containers for the unfiltered water and the filtered water.

Figure 3:
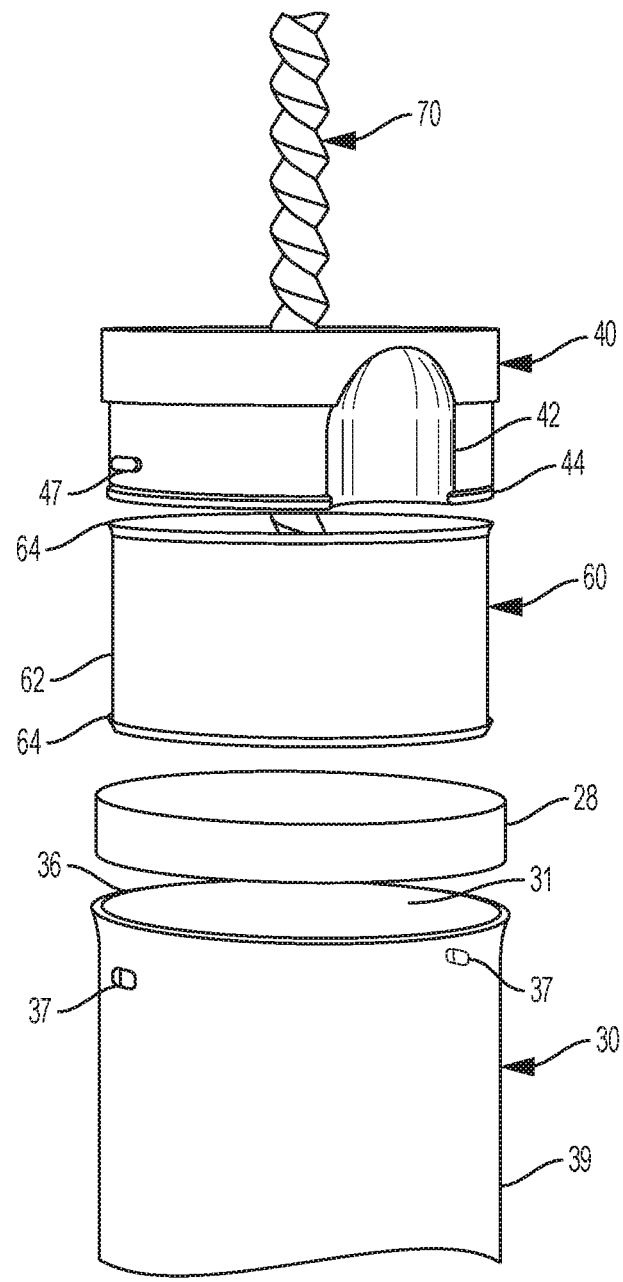
FIG. 3 is an enlarged view of a portion of the water filter system of FIG. 2.

As shown in FIG. 3, the top portion 36 of the container 30 further includes at least one locking portion 37 along the inner perimeter of the side wall 39 of the container 30. The locking portion 37 is configured to lock with the complementary locking portion 47 of the lid 40 (as described further herein). The container 30 may include two locking portions 37 on opposite sides of the container 30.

Figure 4:
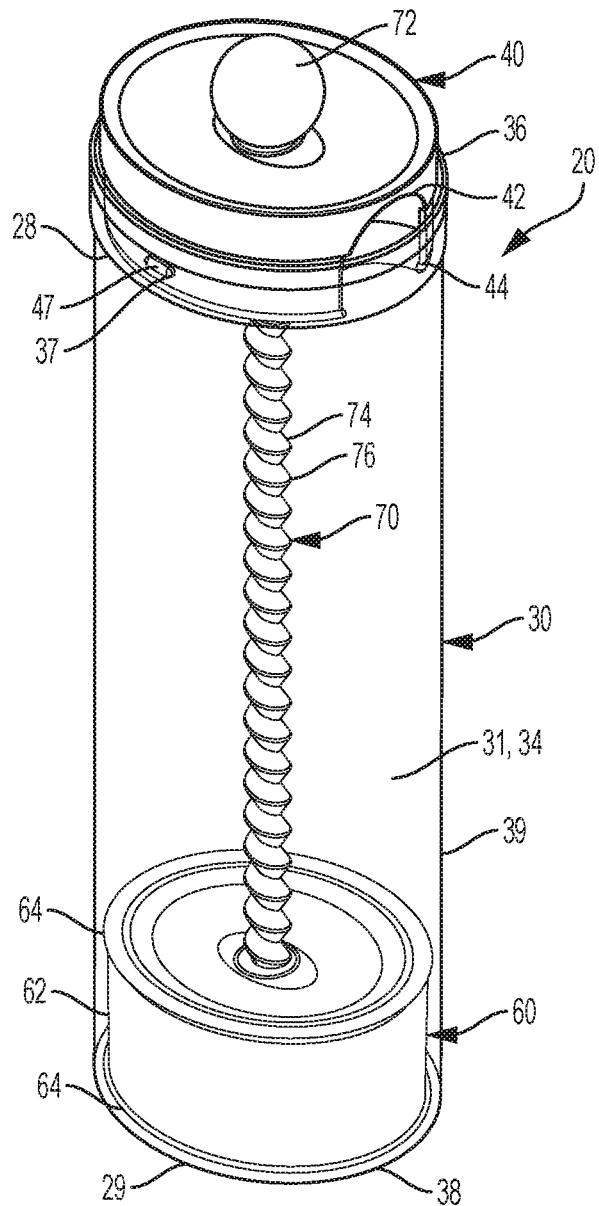
FIG. 4 is a perspective view of the water filter system of FIG. 1.

As shown in FIGS. 2-4 and 6-9, the water filter system 20 may include a band 28 that is positionable along the outside surface of the side wall 39 of the container 30 (i.e., outside of the cavity 31). As shown in FIG. 4, the band 28 may be positioned along the outside of the locking portions 37 of the container 30 in order to reinforce the strength of the area surrounding the locking portions 37 due to any thinness or holes from the locking portions 37. Accordingly, the band 28 provides additional strength to the container 30, in particular when the lid 40 is exerting pressure to the container 30 as the water is being filtered. The band 28 may be a variety of different materials, such as stainless steel.

Lid

As shown in FIGS. 3-4, the water filter system 20 includes a cap or lid 40 that at least partially closes off the top portion 36 of the container 30. Accordingly, the lid 40 is positionable on top of or at least partially within the top portion 36 of the container 30 (opposite the end wall 29 along the length of the container 30) and is configured to attach to the container 30.

Figure 5:
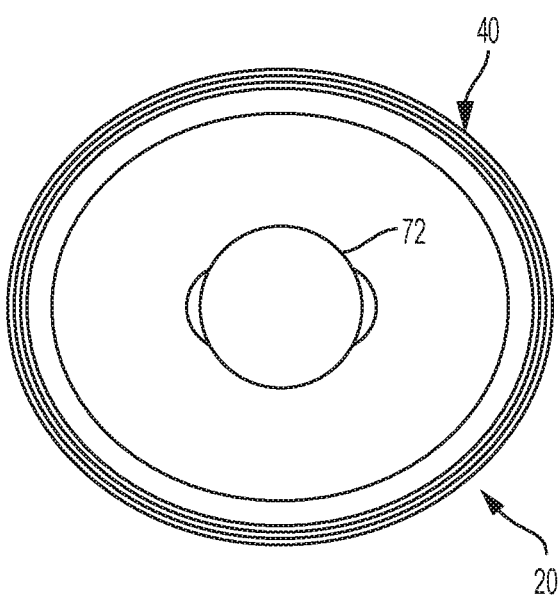
FIG. 5 is a top view of the water filter system of FIG. 4.

As shown in FIGS. 4-5, at least a portion of the outer shape of the lid 40 (in particular a lower portion of the lid 40) (i.e., the cross-sectional shape taken along a horizontal plane) is substantially the same as or complementary to the inner shape of the cross-section (taken along the horizontal plane) of the container 30 such that the lid 40 and the container 30 fit with each other and do not rotate relative to each other. For example, the lid 40 may fit at least partially within the cavity 31 of the container 30 (or vice versa). According to various embodiments, the lid 40 may be non-circular (e.g., oval, rectangular, hexagonal) and/or include a protrusion 49 complementary to, fits within, and interlocks with the groove 19 of the container 30 (as shown in FIG. 21). Alternatively, the container 30 may have the protrusion 49 and the lid 40 may have the groove 19.

Figure 6:
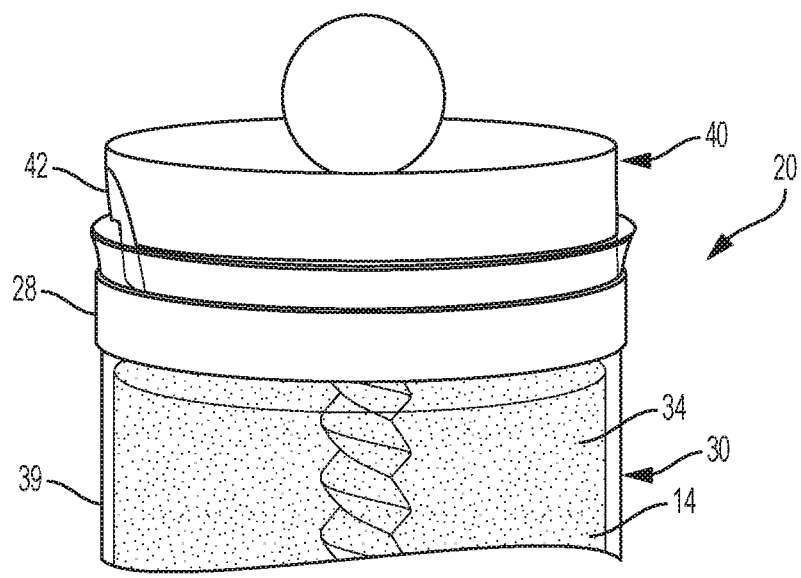
FIG. 6 is a side view of a top portion of the water filter system of FIG. 1.
Figure 7:
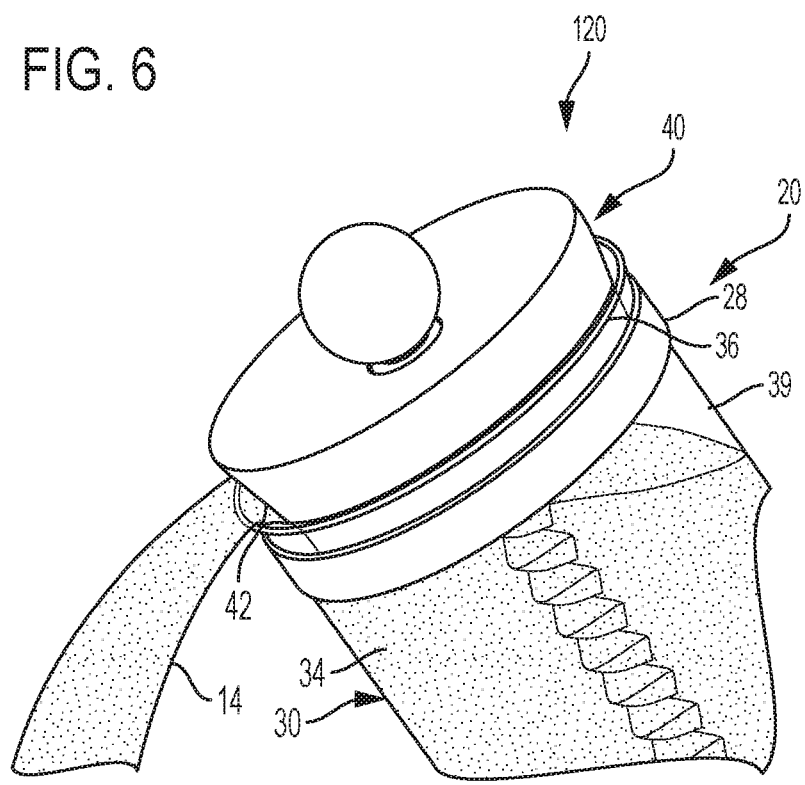
FIG. 7 is a side view of a top portion of the water filter system of FIG. 1 pouring out filtered water.

As shown in FIGS. 3-4, the lid 40 may include at least one spout opening or portion 42 that allows filtered water 14 to be poured out from within the container 30 while the lid 40 is still attached to the container 30. Filtered water 14 remains in the container 30 when the container 30 is upright (as shown in FIG. 6) and is poured through the spout portion 42 when the container 30 is tilted at least partially over after filtration (as shown in FIG. 7). According to one embodiment, the spout portion 42 may be a cut-away or indented portion of the lid 40 that prevents a portion of the outer perimeter of the lid 40 from sealing with a portion of the inner perimeter of the container 30 and provides a gap between the portion of the outer perimeter of the lid 40 and the inner perimeter of the container 30 such that filtered water 14 can flow between the lid 40 and the top portion 36 of the container 30.

Figure 9:
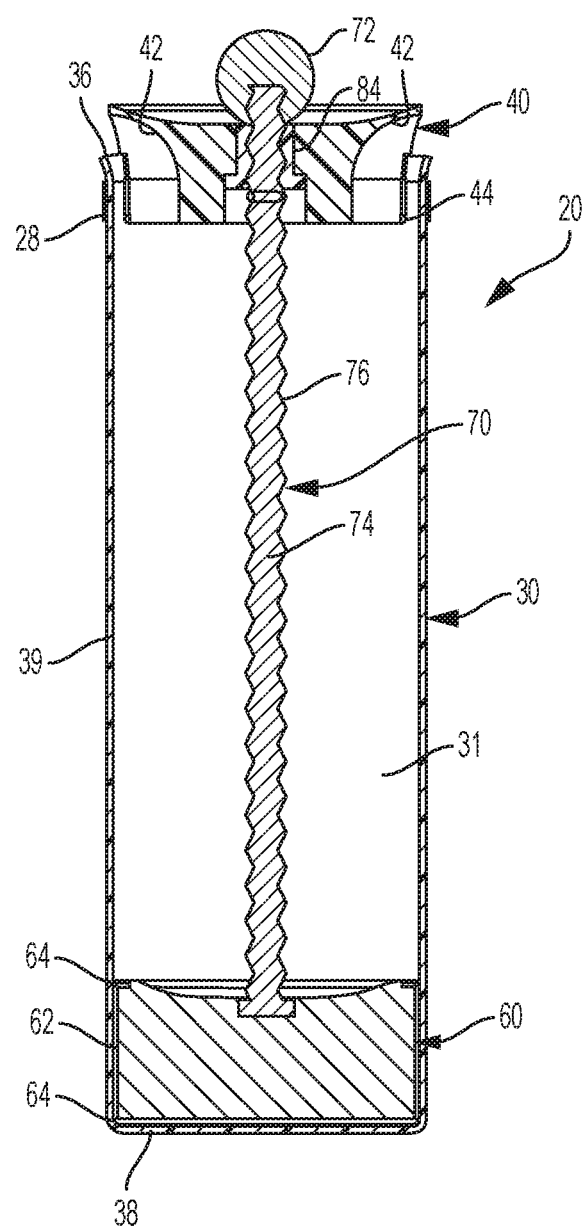
FIG. 9 is a cross-sectional view through Section 9-9 of the water filter system of FIG. 8.
Figure 10:
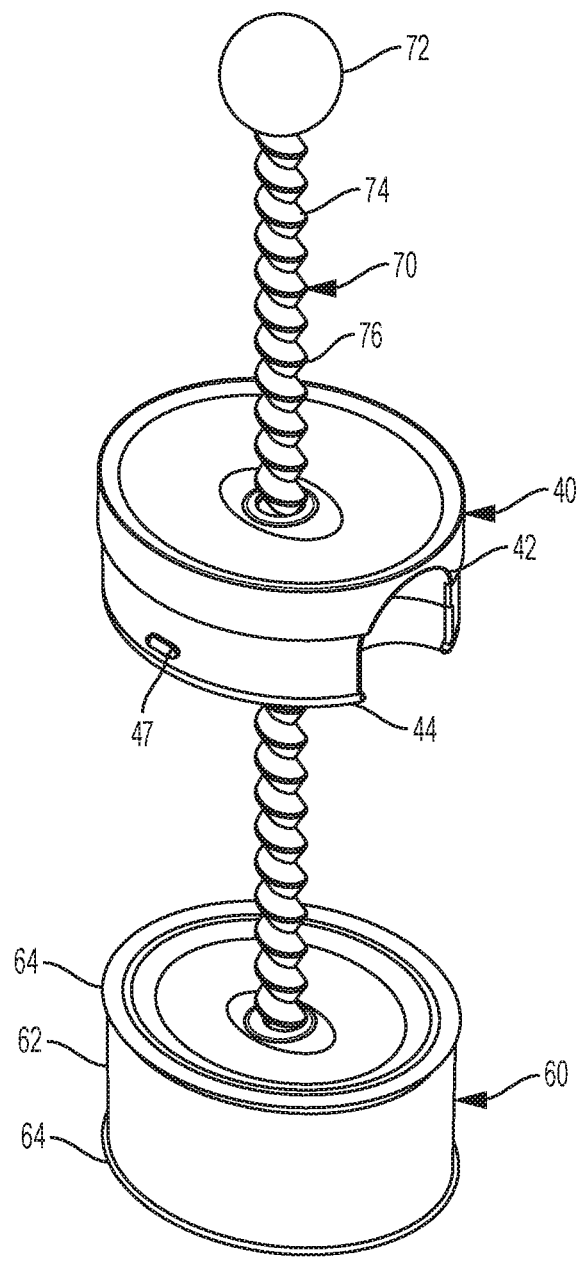
FIG. 10 is a perspective view of a portion of the water filter system of FIG. 1.
Figure 11:
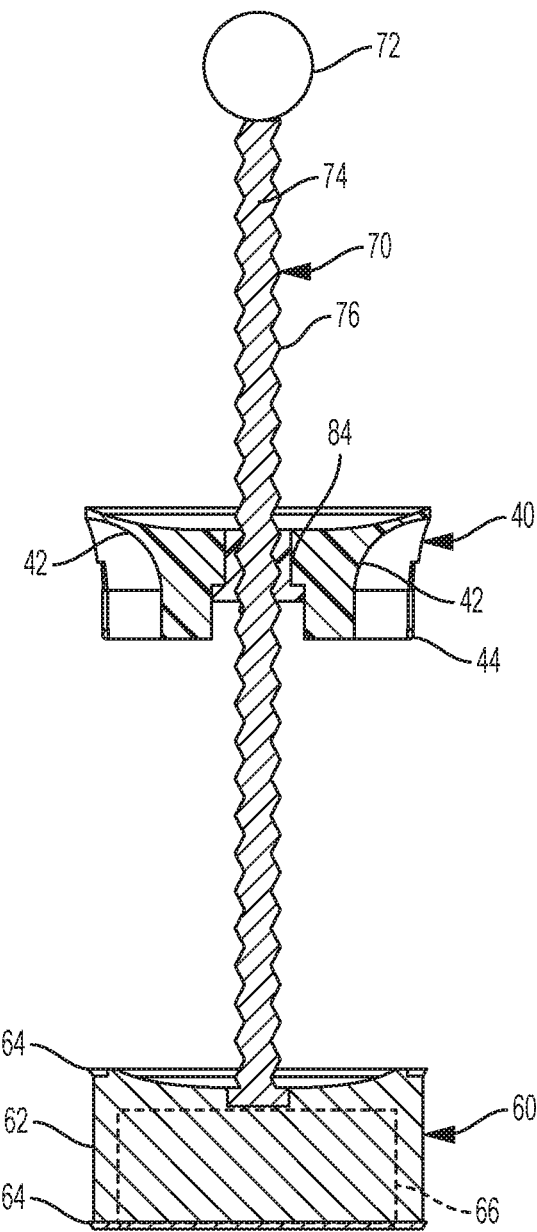
FIG. 11 is a cross-sectional view of the water filter system of FIG. 10.

According to one embodiment as shown in FIGS. 3-4, the spout portion 42 may have an arched or domed shape. The spout portion 42 may extend along a portion of the height of the lid 40 (i.e., along an entire portion of the height of the lid 40 that is configured to extend into the cavity 31 and along only a portion of the height of the lid 40 that extends above the container 30) such that the filtered water 14 is poured out through and along the side (rather than the top) of the lid 40. Alternatively, the spout portion 42 may be a hole in the lid 40. According to one embodiment as shown in FIGS. 9 and 11, the lid 40 may include two spout portions 42 (that are side spouts) on opposite sides of the lid 40.

As shown in FIGS. 3-4, the lid 40 also may include at least one seal member 44 that extends around a portion of the outer circumference or periphery of the lid 40 (except for the spout portion 42 of the lid 40). The seal member 44 is configured to seal to the inner surface of the side wall 39 of the container 30 (within the cavity 31 and along the top portion 36 of the container 30) to prevent the water from inadvertently leaking or spilling out of the container 30. The seal member 44 may be, for example, an over mold seal member or an o-ring, etc.

The lid 40 and the top portion 36 of the container 30 are configured to interlock with each other in a variety of different ways in order to prevent any relative movement between the lid 40 and the container 30. For example, as shown in FIGS. 3-4, the lid 40 may include at least one locking portion 47 along the outer perimeter of the lid 40. The locking portion 47 is complementary (in terms of both size, shape, and position) to the locking portion 37 of the container 30 such that the locking portion 47 of the lid 40 locks to the container 30, specifically with the locking portion 37 of the container 30. The lid 40 may include two locking portions 47 on opposite sides of the lid 40.

The locking portions 37 and 47 may interlock with each other in order to attach and lock and secure the lid 40 and the container 30 together, which prevents any relative movement (both rotationally and along the length of the container 30) between the lid 40 and the container 30. By locking the lid 40 and the container 30 together, the lid 40 is kept in place during water filtration and allows the spring system 80 to press the filter element 60 away from the lid 40 and down along the container 30 (as described further herein). According to one embodiment, one of the locking portions 37 and 47 may be a cavity, aperture, or notch and the other of the locking portions 37 and 47 may be a protrusion or extension that fits into the notch.

Filter Element

Figure 8:
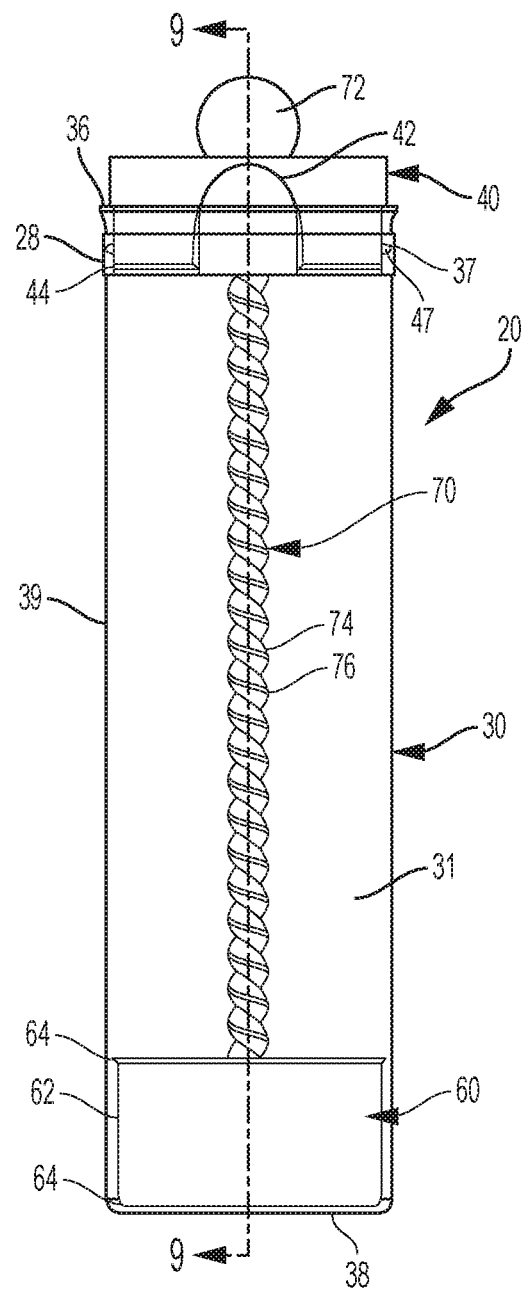
FIG. 8 is a front view of the water filter system of FIG. 1.
Figure 17:
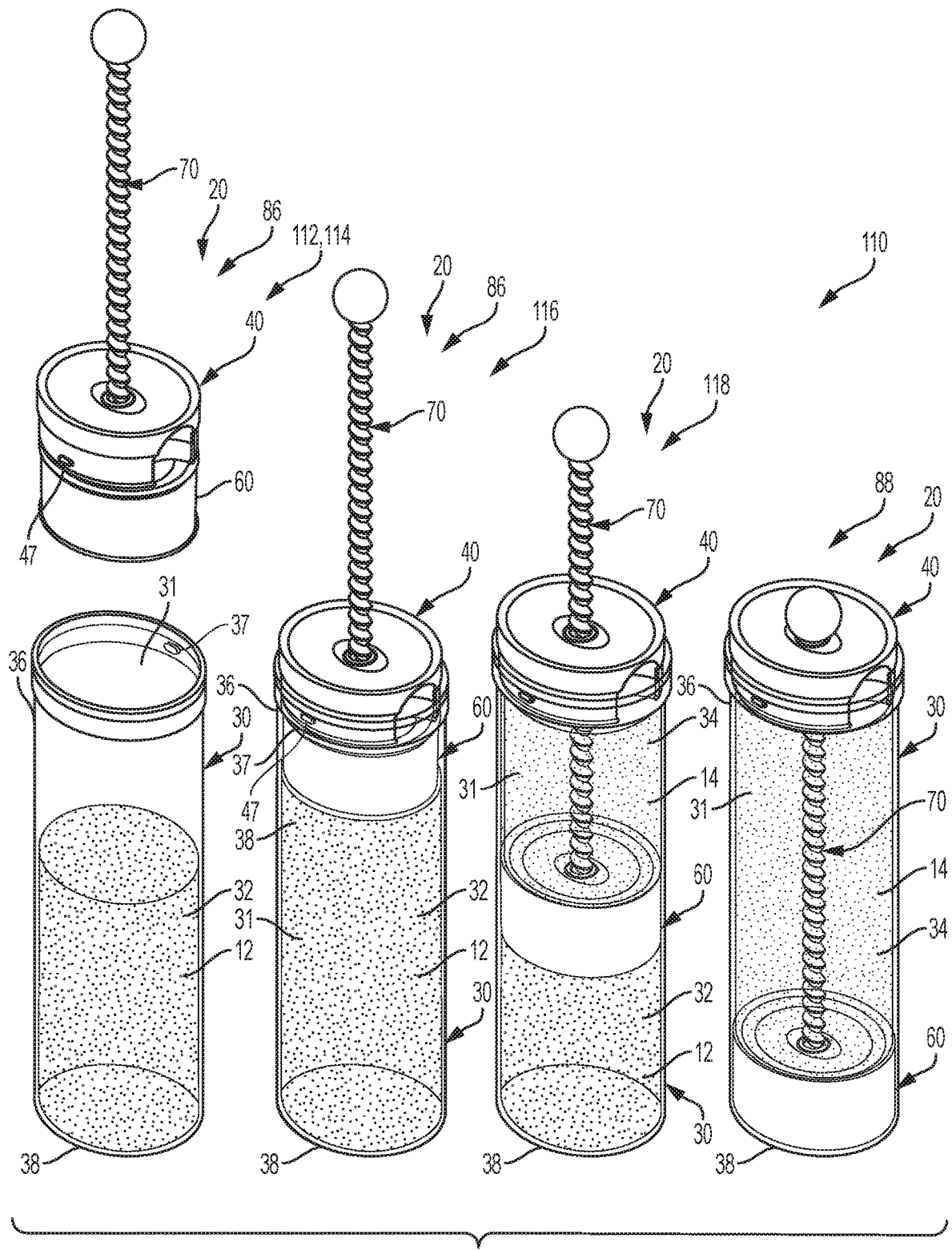
FIG. 17 illustrates perspective views of the water filter systems of FIG. 1 filtering water.

As shown in FIGS. 8-11, the water filter system 20 includes a filter puck or filter element 60 that is configured to filter the unfiltered water 12 and is movable within the container 30. As shown in FIGS. 8-9, the filter element 60 is positioned within the cavity 31 of the container 30. As shown in FIGS. 1 and 17 (and as described further herein), the filter element 60 is movable within the cavity 31 and along the length of the cavity 31 of the container 30 in order to filter the unfiltered water 12. According to one embodiment with the spring system 80 (as described further herein), the filter element 60 is automatically moved through the water in the cavity 31 to filter the water. According to another embodiment, the filter element 60 is manually pushed through the water in the cavity 31 to filter the water (as described further herein).

As shown in FIGS. 8-11, the filter element 60 includes a filter element housing 62 that houses the various components of the filter element 60. The outer shape of the housing 62 (and of the entire filter element 60) is substantially the same as or complementary to the inner shape of the cross-section (taken along the horizontal plane) of the container 30 (e.g., non-circular (e.g., oval, rectangular, hexagonal) and/or including a protrusion 69 complementary to the groove 19 of the container 30 (as shown in FIG. 21), etc.) such that the filter element 60 fits within and does not rotate relative to the container 30. The width of the filter element 60 is slightly smaller than the width of the container 30. Accordingly, the filter element 60 fits within the cavity 31 of the container 30 and is keyed into the container 30, which prevents the filter element 60 (and thus the plunger 70) from rotating as the spring system 80 unloads, which forces the plunger 70 to move the filter element 60 downward through the unfiltered water 12 within the cavity 31 (as described further herein).

As shown in FIG. 11, the filter element 60 includes a filter media 66 that is attached to or at least partially positioned within the housing 62 of the filter element 60 and is configured to filter the unfiltered water 12 as the water moves through the filter media 66 (and through the entire filter element 60). Accordingly, as the filter element 60 moves along the length of the cavity 31, the filter element 60 presses down onto the unfiltered water 12, which forces the unfiltered water 12 to move into and through the filter media 66 of the filter element 60, which filters the unfiltered water 12. The unfiltered water 12 is then outputted from the filter element 60 as filtered water 14. The filter element 60 and/or the filter media 66 may be removable replaceable, or interchangeable, etc. The filter media 66 can include a variety of different types of filter media according to the desired filtration technique and the types of contaminants that will be filtered out of the water.

As shown in FIGS. 8-11, the filter element 60 also may include at least one seal member 64 that extends around the outer circumference or periphery of the housing 62 of the filter element 60. The seal member 64 is configured to seal to the inner surface of the side wall 39 of the container 30 to prevent the unfiltered water 12 and the filtered water 14 from mixing with each other and to keep the unfiltered water 12 and the filtered water 14 separate, thereby fluidly separating the unfiltered water area 32 from the filtered water area 34. In particular, the seal member 64 seals to the inside surface of the side wall 39 of the container 30 (within the cavity 31) while the filter element 60 is being moved along the length of the container 30. According to one embodiment, the filter element 60 may include two seal members 64, where one seal member 64 is positioned at the top of the housing 62 of the filter element 60 and the other seal member 64 is positioned at the bottom of the housing 62 of the filter element 60.

Plunger

As shown in FIGS. 8-11, the water filter system 20 includes a plunger 70 that movably connects the filter element 60 and the lid 40 together. The plunger 70 is coupled to the filter element 60 and is movable through the lid 40 along at least a portion of the length of the plunger 70. Utilizing either the spring system 80 or the user's manual hand power (each of which are described further herein), the plunger 70 causes the filter element 60 to move relative to the lid 40 (and the container 30) along the length of the cavity 31 in order to filter the unfiltered water 12. The plunger 70 is moveable relative to the lid 40 in order to move the filter element 60 to filter the unfiltered water 12 and is non-movable relative to the filter element 60 to force the filter element 60 to move through the water (and to move relative to the lid 40).

The plunger 70 includes a rod 74 that extends between a top portion and a bottom portion of the plunger 70. As shown in FIGS. 9 and 11, the rod 74 extends at least partially through the lid 40 and the spring system 80 (as described further herein) such that the plunger 70 is movably attached to the lid 40 (in lengthwise direction of the rod 74). The rod 74 may be a threaded rod and include exterior helical ridges, a spiral, grooves, or threads 76 along at least a portion of the length of the rod 74.

The bottom portion of the plunger 70 (and therefore, the bottom portion of the rod 74) is statically, non-rotatably, and nonmovably attached to the filter element 60 (as shown in FIGS. 9 and 11). Accordingly, as the plunger 70 is moved up and down within the container 30, the filter element 60 is moved up and down concurrently with the bottom portion of the plunger 70.

The top portion of the plunger 70 (and therefore, the top portion of the rod 74) includes a knob 72 that is configured to extend out of the top of the lid 40, regardless of the position of the plunger 70 and the filter element 60 relative to the lid 40. The knob 72 may provide an area for the user to grasp to pull the plunger 70 up relative to the lid 40 and load up the spring system 80 (as described further herein) or to manually push the plunger 70 (and thus the filter element 60) down relative to the lid 40 to filter the water.

The plunger 70 may be made from a lubricious or smooth material in order to reduce friction as the water filter system 20 is filtering the water.

Spring System

According to one embodiment as shown in FIGS. 12-16, the water filter system 20 may be spring-powered in order to automatically move the filter element 60 through the water to filter the unfiltered water 12. Accordingly, the water is filtered by the filter element 60 without the user having to manually move the filter element 60 directly or indirectly through the water. The spring-powered water filter system includes a spring system 80 that is configured to be loaded by the user with manual power (as described further herein), to store energy, and to release power or circular movement energy as the spring system 80 unloads in order to automatically move or force the filter element 60 down away from the lid 40, along the length of the container 30, and toward the bottom portion 38 of the container 30 to filter the unfiltered water 12.

The spring system 80 is configured to force the filter element 60 downward through the water in the container 30, which pressurizes the unfiltered water 12 within the cavity 31, thereby forcing the unfiltered water 12 to move through the filter media 66 of the filter element 60. By pressurizing the unfiltered water 12, the water filter system 20 is able to filter the water relatively quickly, compared to conventional non-electric filters which only rely on gravity. However, since the water filter system 20 does not require any electric power and is substantially free of any electric power, the water filter system 20 is also able to filter the water relatively quietly, compared to electric filters which are relatively noisy.

The spring system 80 engages the lid 40 and the plunger 70. Accordingly, as shown in FIGS. 12-16, the spring system 80 is positioned at least partially within the lid 40, and the rod 74 extends through a portion of the spring system 80. The spring system 80 includes at least one coil or spring 82 and a nut 84. The spring 82 may be a flat spiral torsion spring made out of metal ribbon (e.g., spring steel), such as a mainspring, and is movable between a loaded position 86 and an unloaded position 88. Accordingly, the spring 82 rotates and unwinds or untwists about itself into the loaded position 86 when a load is applied to its outermost end, and winds or twists back up about itself into the unloaded position 88 when the load is released from its outermost end (or when the torque from the spring 82 overcomes the load). The spring 82 is configured to drive or rotate the nut 84, which is configured to drive or move the rod 74 up and down, which automatically pushes the filter element 60 through the water in the cavity 31.

Figure 12:
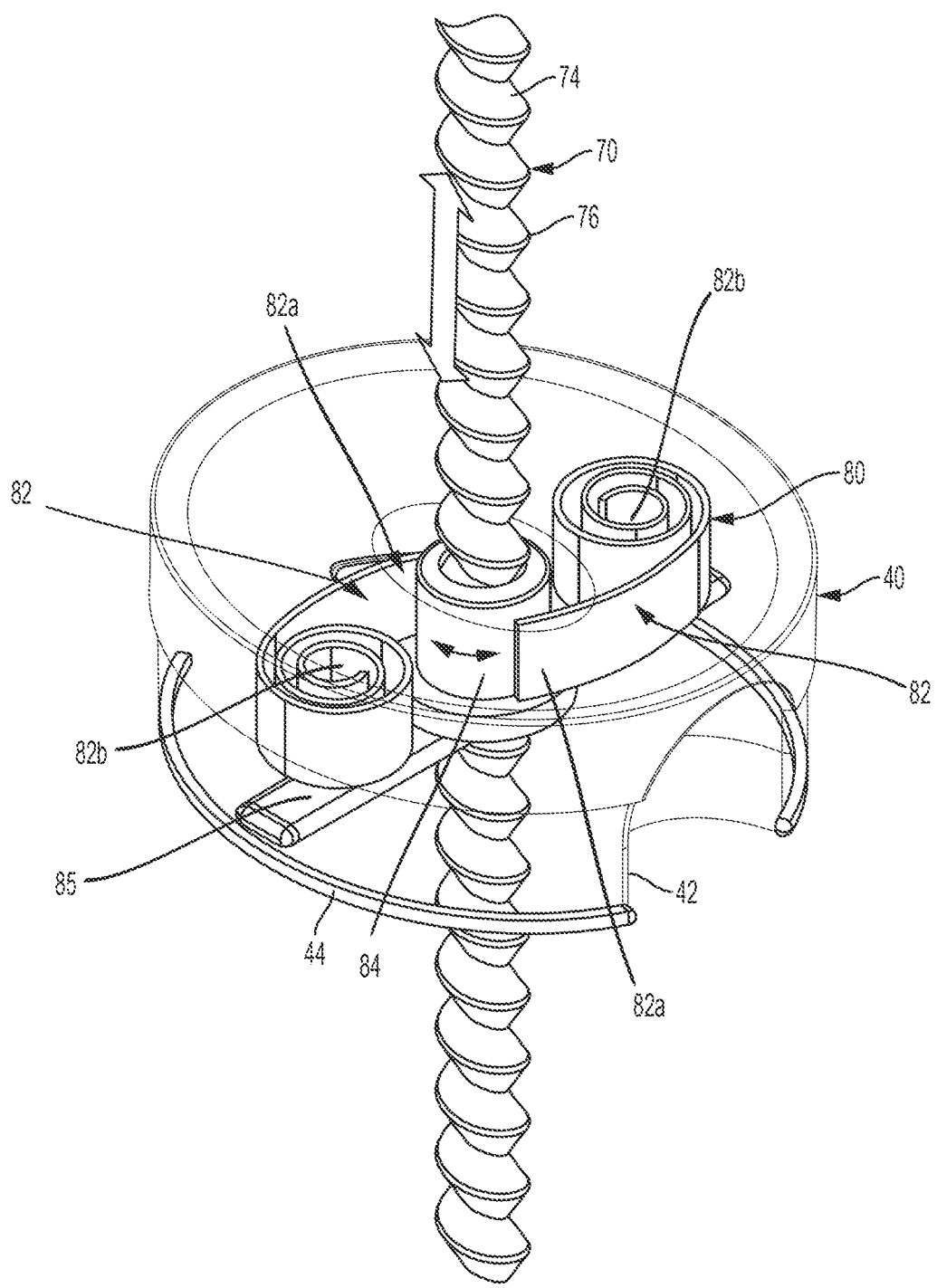
FIG. 12 is a partially see-through, perspective view of a portion of the water filter system of FIG. 1.
Figure 13:
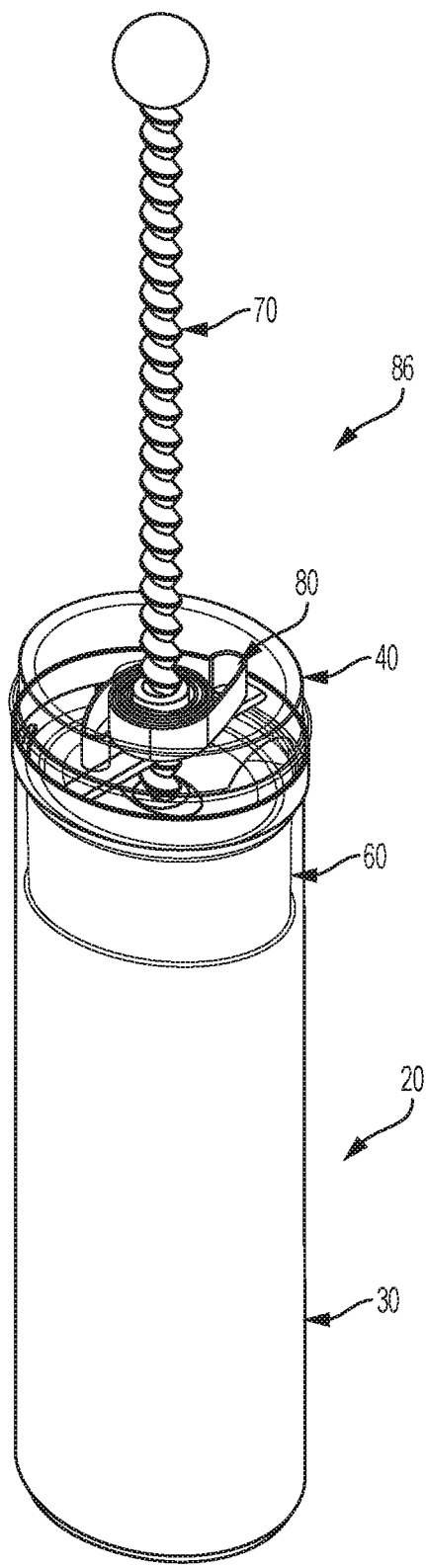
FIG. 13 is a partially see-through, perspective view of the water filter system of FIG. 1 in a loaded position.
Figure 14:
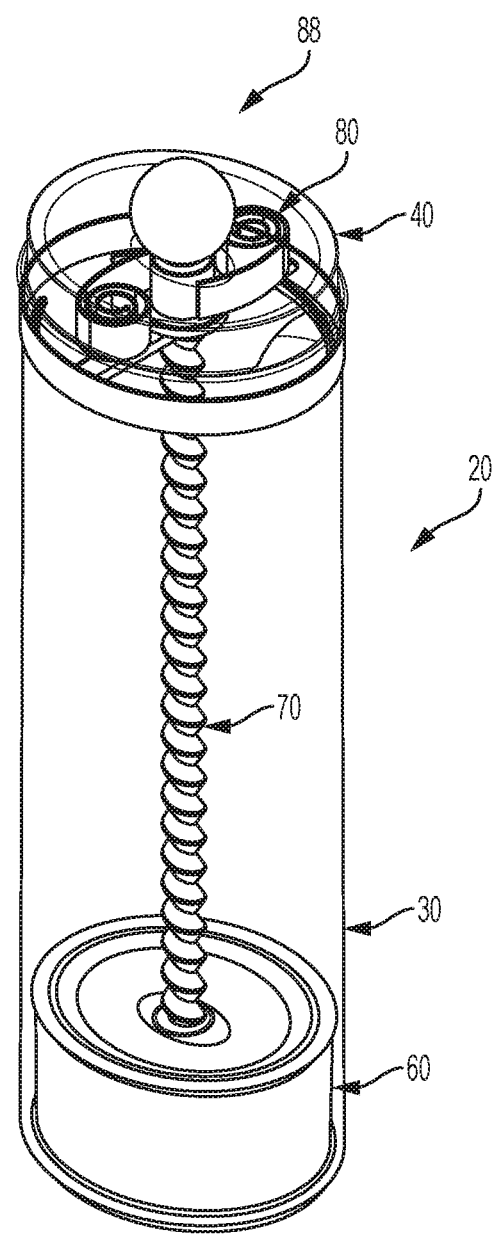
FIG. 14 is a partially see-through, perspective view of the water filter system of FIG. 1 in an unloaded position.
Figure 15:
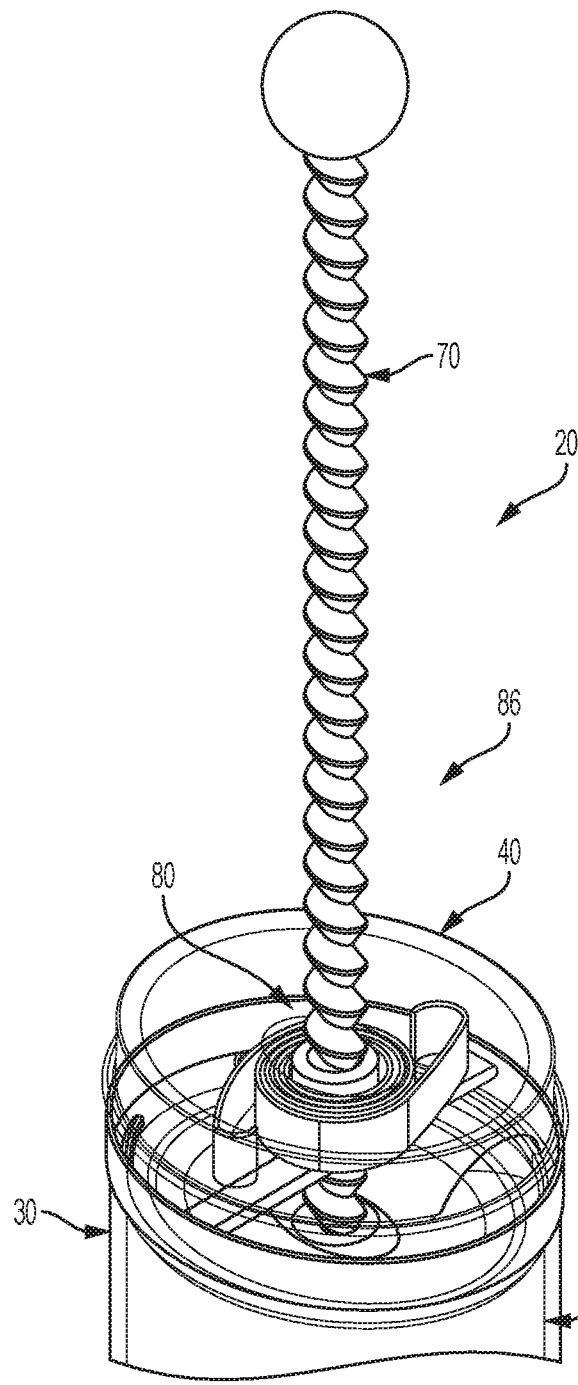
FIG. 15 is a partially see-through, perspective view of a portion of the water filter system of FIG. 1 in a loaded position.
Figure 16:
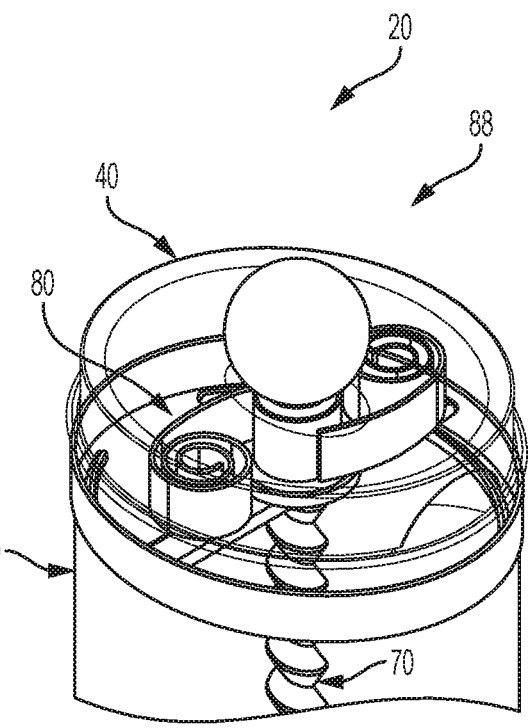
FIG. 16 is a partially see-through, perspective view of a portion of the water filter system of FIG. 1 in an unloaded position.

As shown in FIG. 12, the spring system 80 includes two springs 82 with respective outermost ends attached to opposite sides the nut 84 and spiraled or wound in a spiral in the same direction about themselves as each other. The nut 84 is positioned between and attached or connected to the two springs 82. The springs 82 each have a first end 82*a* attached to the outside of the nut 84 and a second end 82*b* coupled to a crosspiece 85. The crosspiece 85 couples to the lid 40 at both the first end 82*a* and the second end 82*b* such that rotational movement of the nut 84 causes the springs 82 to rotate (and vice versa). Accordingly, rotation of the nut 84 causes the springs 82 to wind up or to unwind about themselves and the nut 84 (i.e., move between the loaded position 86 and the unloaded position 88), depending on the direction of rotation of the nut 84. More specifically, as the nut 84 rotates in a direction opposite the direction that the springs 82 are wound about themselves, the nut 84 causes both of the springs 82 to unwind about themselves (thereby winding up around the outside of the nut 84) to the stressed or loaded position 86 (i.e., a high energy-storage position in which the springs 82 are relatively stressed, as shown in FIGS. 13 and 15). If the nut 84 is allowed to rotate freely (i.e., absent any external force that is greater than the force or torque of the springs 82), the springs 82 will wind back up about themselves (thereby unwinding from around the nut 84 and moving the nut 84 in the opposite rotational direction) into the relaxed, resting, or unloaded position 88 (i.e., a low energy-storage position in which the springs 82 are relatively relaxed, as shown in FIGS. 14 and 16). The same movement will result if the nut 84 is otherwise rotated in the opposite direction (i.e., in the same direction that the springs 82 wind about themselves).

The nut 84 includes interior threads that are complementary to the exterior threads 76 along the length of the rod 74 such that the nut 84 is rotatably attached to the plunger 70. The rod 74 of the plunger 70 extends through the center portion of the nut 84. Accordingly, as shown in FIG. 12, as the rod 74 moves up and down relative to the spring system 80 (and the lid 40) in order to move the filter element 60 up and down within the container 30, the nut 84 is rotated, and the springs 82 are thereby either loaded or unloaded, as described further herein.

Movement of the spring 82 from the loaded position 86 to the unloaded position 88 causes the filter element 60 to move along at least a portion of the length of the cavity 31 (away from the lid 40) and filter the water. As shown in FIGS. 13 and 15, the springs 82 are in the loaded position 86 when the plunger 70 is pulled or moved as much as possible above the lid 40 and the filter element 60 is close to or abutting the bottom of the lid 40. More specifically, as the plunger 70 is moved into the loaded position 86, the plunger 70 causes the nut 84 to rotate (in a direction opposite the direction that the springs 82 are wound about themselves) due to interaction between the external threads 76 on the rod 74 and the internal threads within the nut 84. The rotation of the nut 84 causes the springs 82 to unwind about themselves and thus to wind up around the outside of the nut 84 into the loaded position 86. Since the respective outermost ends of the springs 82 are attached to opposite sides of the nut 84, the springs 82 wind around each other around the nut 84 (in an overlapping manner) in the loaded position 86. Accordingly, in the loaded position 86, the springs 82 are relatively stressed and therefore are storing a relatively large amount of potential energy, which will eventually be used to automatically move the filter element 60 through the water and thus filter the water. The water is unfiltered when the springs 82 are in the loaded position 86, and the entire cavity 31 is the unfiltered water area 32. The plunger 70 and/or filter element 60 may optionally lock to the lid 40 to temporarily keep the springs 82 in the loaded position 86.

As shown in FIGS. 14 and 16, the springs 82 are in the unloaded position 88 when the plunger 70 is moved as much as possible below the lid 40 and the filter element 60 is the farthest away from the bottom of the lid 40 (and closest to the bottom portion 38 and the end wall 29 of the container 30) compared to the loaded position 86. In order to move the spring 82 into the unloaded position 88, the plunger 70 or filter element 60 is released or unlocked from the lid 40, which allows the springs 82 to unwind from the nut 84 (since the torque from the springs 82 is larger than the force required to move the filter element 60 through the cavity 31). As the springs 82 unwind from the nut 84, the springs 82 thereby wind back around about themselves into their respective low energy positions (i.e., the unloaded position 88), which causes the nut 84 to rotate in the opposite direction (i.e., in the same direction that the springs 82 wind about themselves). Due to the interaction between the external threads 76 on the rod 74 and the internal threads within the nut 84 and since the filter element 60 (and thus the plunger 70) cannot rotate relative to the container 30 due to the relative shapes of the filter element 60 and the container 30 (and since the rod 74 is statically attached to the filter element 60), the rotation of the nut 84 forces the plunger 70 (and thus the filter element 60) downward (away from the lid 40) as the springs 82 are released into the unloaded position 88.

In the unloaded position 88, the springs 82 are relatively relaxed and less stressed (compared to the loaded position 86), more wound up about themselves, and less wound around the outside of the nut 84. Accordingly, the springs 82 store a relatively smaller amount of potential energy in the unloaded position 88 since the energy stored in the springs 82 in the loaded position 86 was released as the springs 82 moved back to the unloaded position 88, causing the filter element 60 to move through the water, thereby filtering the water. By using the spring system 80 to move the plunger 70 downward, the plunger 70 forces the filter element 60 to move through the water, which filters the unfiltered water 12, as described further herein. Accordingly, the water is filtered when the springs 82 are in the unloaded position 88, and the majority of or the entire cavity 31 is the filtered water area 34.

Filtration of the Water Filter System

Figure 18:
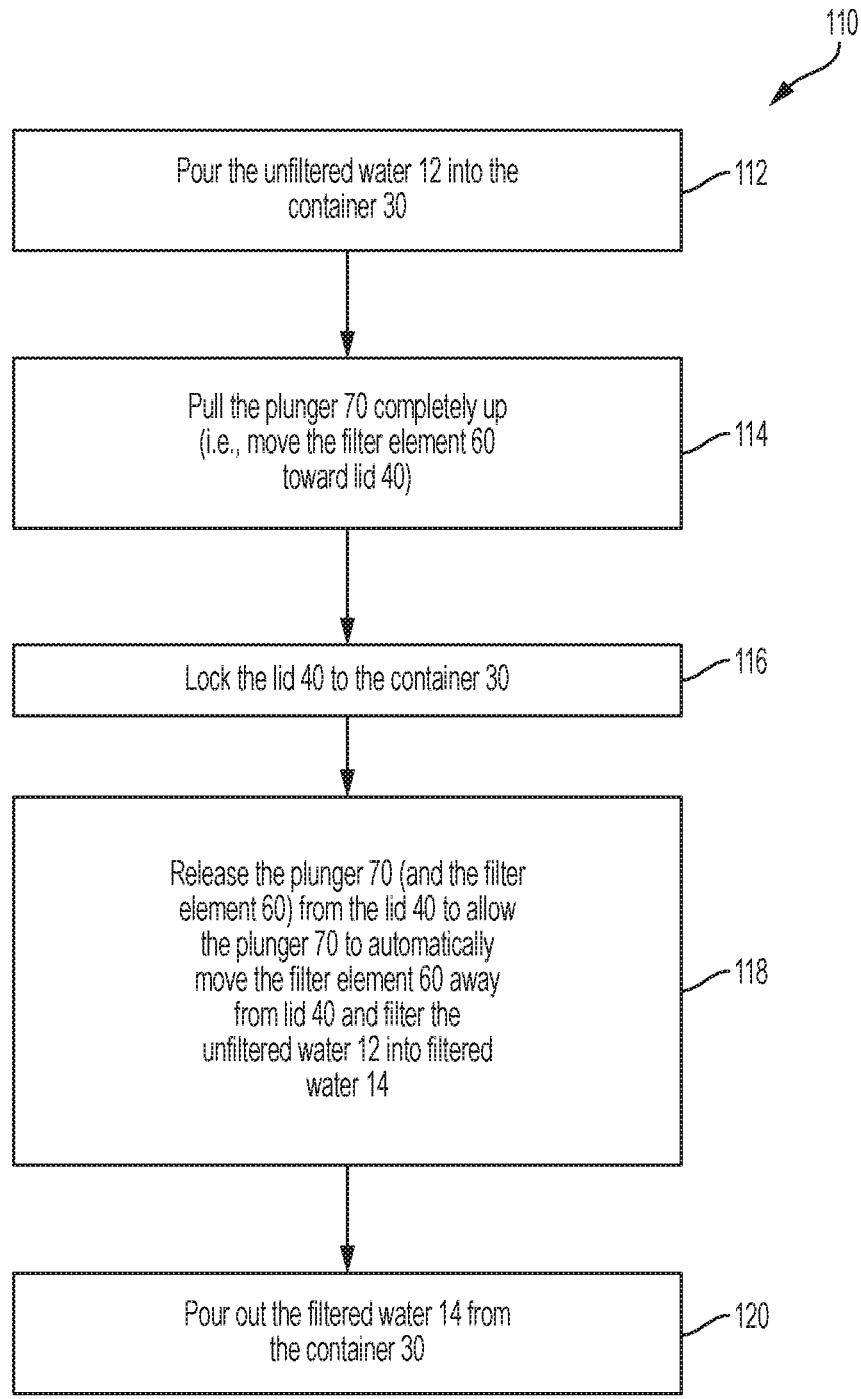
FIG. 18 is a schematic flow diagram illustrating the water filtration of the water filter system of FIG. 1.

As shown in FIGS. 17 and 18 (as well as FIG. 1), the water filtration process (110) includes various steps in order to filter the unfiltered water 12 into filtered water 14. First, in order to start the water filtration process (110), the unfiltered water 12 is poured or moved into the container 30 (112), and the plunger 70 is pulled or moved completely up relative to and toward the lid 40 (114) (i.e., the filter element 60 is moved upward toward the lid 40 until the filter element 60 is relatively close to or abutting the bottom of the lid 40). The user may grasp the knob 72 of the plunger 70 in order to move the plunger 70 upward in such a manner. By moving the plunger 70 completely up and toward the lid 40, the external threads 76 on the rod 74 rotate the nut 84 of the spring system 80, which moves the springs 82 into the loaded position 86 to later allow the springs 82 to automatically move the filter element 60 within the container 30 (as described further herein). The plunger 70 and/or filter element 60 may optionally lock to the lid 40 to temporarily keep the springs 82 in the loaded position 86.

Subsequently, the lid 40 is moved onto or inserted at least partially into the top portion 36 of the container 30 and is attached to the container 30. Since the filter element 60 is close to or abutting the bottom of the lid 40 and optionally locked to the filter element 60, the filter element 60 is also moved into the cavity 31 of the container 30 (specifically into the top portion 36 of the container 30). Before the filtration begins and before the filter element 60 moves through the container 30, the filter element 60 is on top of or above the unfiltered water 12 within the container 30 (and the entire cavity 31 of the container 30 is the unfiltered water area 32). The lid 40 is then locked to the container 30 (116). For example, the locking portion 47 of the lid 40 is interlocked with the locking portion 37 of the container 30.

Once the lid 40 is locked to the container 30, the plunger 70 (and thus the filter element 60) may be released from the lid 40. The plunger 70 and the filter element 60 may be released from the lid 40 automatically (i.e., when the lid 40 is locked to the container 30, the plunger 70 and the filter element 60 are automatically unlocked from the lid 40) or manually upon activation of a button or notch (e.g., a button may be pressed by the user to unlock the plunger 70 and the filter element 60 from the lid 40).

Once the plunger 70 and the filter element 60 are released from the lid 40, the spring system 80 to automatically move, force, or press the plunger 70 downward. More specifically, the springs 82 can begin to unwind from around the nut 84 back toward the unloaded position 88, which rotates the nut 84. The rod 74 (which is threadably attached to the nut 84) of the plunger 70 cannot rotate with the nut 84 since the plunger 70 is statically attached to the filter element 60 within the container 30, and the filter element 60 cannot rotate within the container 30 due to the keyed and relative shapes of the container 30 and the filter element 60 (as described further herein). Therefore, only the nut 84 can rotate, which moves the plunger 70. As the nut 84 rotates, the nut 84 forces the rod 74 downward, and the rod 74, in turn, forces the filter element 60 downward (i.e., away from the lid 40, through the water, and toward the bottom portion 38 of the container 30). Accordingly, the plunger 70 automatically moves, forces, or presses the filter element 60 downward away from the lid 40 within the container 30, through the water, and along the length of the container 30 (118), without any help or force from the user.

As plunger 70 pushes or moves the filter element 60 through the water within the container 30, the water is forced through the filter element 60, which allows the filter element 60 to filter the unfiltered water 12 into filtered water 14. The lid 40, meanwhile, remains locked to the container 30, which provides leverage for the spring system 80 to move the filter element 60 through the water. During filtration and as the filter element 60 moves through the container 30, the filter element 60 is below the unfiltered water 12 and above the filtered water 14 within the container 30 (and therefore the container 30 includes both the unfiltered water area 32 and the filtered water area 34).

The amount of time required to move the filter element 60 completely through the water within the container 30 depends on a variety of factors such as the length of the container 30, the length of the plunger 70, the size of the entire water filter system 20 (and the amount of unfiltered water 12 to be filtered), and the strength of the springs 82. According to one embodiment, it may take approximately 10 minutes for the spring system 80 to move the filter element 60 completely through all of the unfiltered water 12 and to reach the bottom portion 38 of the container 30.

Once the plunger 70 has moved the filter element 60 completely along the length of the container 30 (or once only the knob 72 of the plunger 70 extends out from the top of the lid 40), the user may pour out the filtered water 14 from the container 30 for use (120) (through, for example, the spout portion 42 of the lid 40, as shown in FIG. 7). After filtration and after the filter element 60 has moved through the container 30, the filter element 60 is below the filtered water 14 (and all of the cavity 31 may optionally be the filtered water area 34) such that the filtered water 14 can be poured out from the container 30.

Hand-Powered Water Filter System

Figures 19, 20:
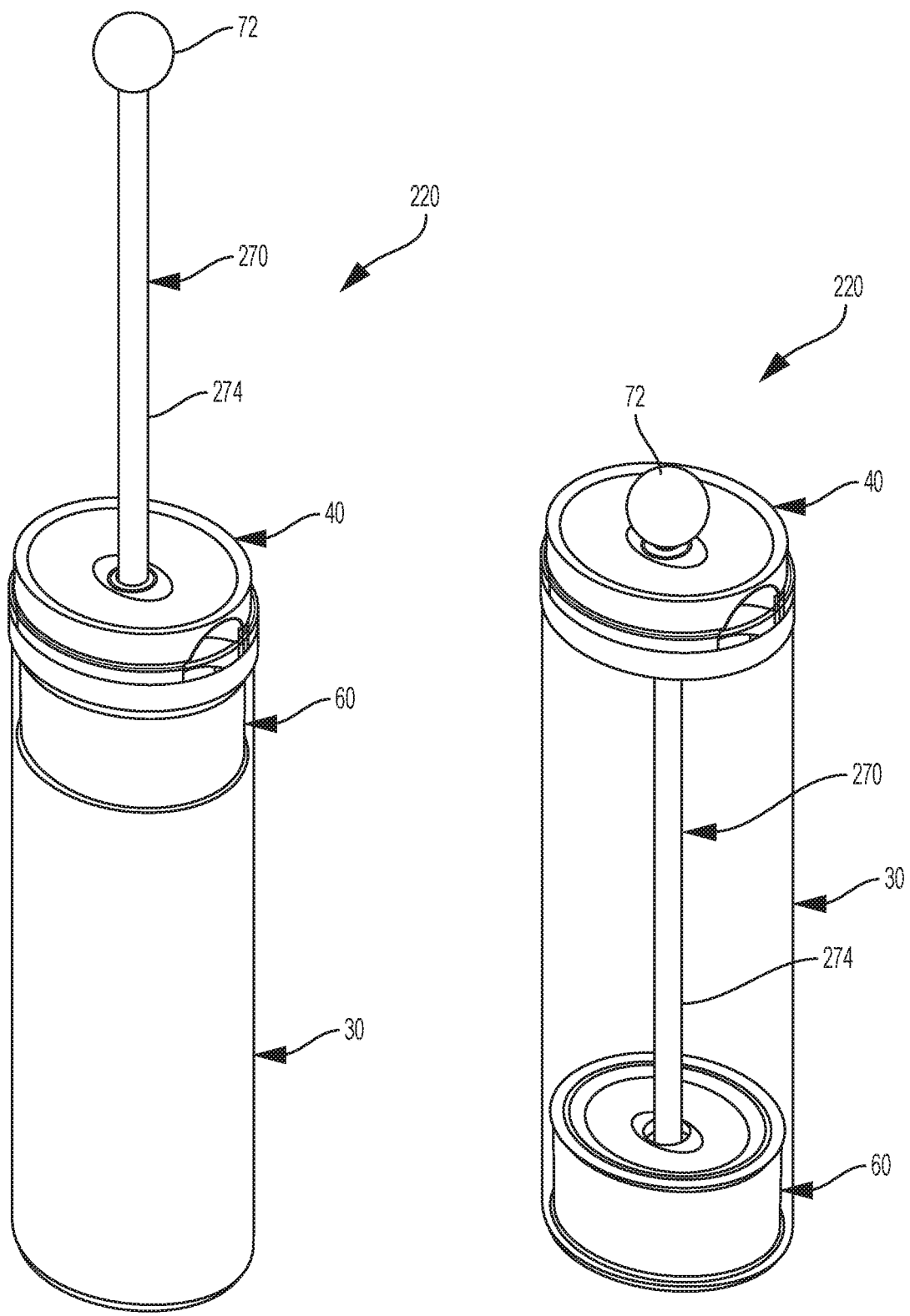
FIG. 19 is a perspective view of a water filter system in an unfiltered position according to one embodiment.
FIG. 20 is a perspective view of the water filter system of FIG. 19 in a filtered position.

According to another embodiment as shown in FIGS. 19-20, a water filter system 220 is shown. The water filter system 220 may include all of the various features, components, and configurations of the water filter system 20, except the water filter system 220 is completely hand-powered by the user, rather than utilizing power from the spring system 80. The same reference numbers are used with the water filter system 220 where applicable.

The water filter system 220 includes all of the same component of the water filter system 20 except for the spring system 80 and the rod 74 of the plunger 70. For example, the water filter system 220 includes, among other components, the container 30 (as described further herein), the lid 40 (as described further herein), the filter element 60 (as described further herein), and a plunger 270. The water filter system 220 does not, however include the spring system 80.

The plunger 270 is similar to the plunger 70 of the water filter system 20, except that the rod 274 of the plunger 270 is simple and straight and does not include exterior threads along its length, unlike the rod 74 of the plunger 70.

Since the water filter system 220 does not use the spring system 80 to move the plunger 270 and the filter element 60 through the water, the water filter system 220 instead relies on the direct power from a user's hands in order to move the plunger 270 (and thus the filter element 60), which filters the unfiltered water 12. For example, the user first pulls up the plunger 270 by grasping and moving the knob 72 (similar to the water filter system 20) in order to move the filter element 60 upward toward the lid 40 before filtration. Once the lid 40 is attached to the container 30 (similar to the water filter system 20), the user uses their hand(s) (rather than any spring system) to directly manually move and press the plunger 270 (and thus the filter element 60) all the way down within the container 30 in order to filter the unfiltered water 12 into filtered water 14. The water filter system 220 may otherwise be used in and function in a similar manner as the water filter system 20.

It is understood that each of the components of the water filter systems 20 and 220 can be used together or separately in any number of different combinations.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the water filter system as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to exemplary embodiments. Other substitutions, modifications, changes and omissions may also be made in the design, operating conditions and arrangement of the various exemplary embodiments without departing from the scope of the present disclosure.

What is claimed is:

1. A water filter system comprising:
   a container for containing water;
   a lid attachable to the container;
   a nut rotatably coupled to the lid, the nut including interior threads;
   a filter element for filtering the water and movable within an inner cavity of the container; and
   a plunger coupled to the filter element and movable through the lid and the nut, the plunger comprising a rod with exterior threads that are sized and shaped to threadably engage the interior threads of the nut and extend along at least a portion of the length of the rod; and
   a spring system having at least one spring with a first end attached to the nut and a second end fixed relative to the lid, wherein the at least one spring is movable between a loaded position and an unloaded position, wherein movement of the at least one spring from the loaded position to the unloaded position causes rotation of the nut, and the plunger to move through the nut, and the filter element to move along at least a portion of the length of the container and filter any water that passes through the filter element.

2. The water filter system of claim 1, wherein the container and the filter element are shaped such that the filter element cannot rotate within the container.

3. The water filter system of claim 2, wherein the container has a non-circular cross-section.

4. The water filter system of claim 2, wherein one of the container and the filter element has a groove and the other of the container and the filter element has a protrusion that is complementary to the groove.

5. The water filter system of claim 1, wherein the inner cavity stores both unfiltered water and filtered water, and wherein the filter element divides the cavity into an unfiltered water area and a filtered water area.

6. The water filter system of claim 5, wherein, as the filter element is moved within the cavity of the container, the filter element converts the unfiltered water area into the filtered water area.

7. The water filter system of claim 1, wherein the lid and the container interlock with each other in order to prevent any relative movement between the lid and the container.

8. The water filter system of claim 1, wherein the rod is nonmovably attached to the filter element and is movably attached to the lid.

9. The water filter system of claim 1, wherein the at least one spring comprises two flat torsion springs, each with a first end attached to the nut and a second end fixed relative to the lid and automatically forces force the filter element away from the lid and through the water in the container to filter the water.

10. The water filter system of claim 9, wherein the spring system is positioned at least partially within the lid.

11. The water filter system of claim 9, wherein the lid further comprises a crosspiece disposed with the lid and the second end of the springs are attached to the crosspiece.

12. The water filter system of claim 9, wherein the two flat torsion springs are relatively stressed and wound around the outside of the nut in the loaded position, and the two flat torsion springs are relatively relaxed and less wound around the outside of the nut in the unloaded position.

* * * * *